(12) United States Patent
Preindl et al.

(10) Patent No.: US 10,581,253 B2
(45) Date of Patent: Mar. 3, 2020

(54) ENERGY STORAGE BALANCING SYSTEM

(71) Applicant: McMaster University, Hamilton (CA)

(72) Inventors: Matthias Preindl, New York, NY (US);
Ali Emadi, Burlington (CA)

(73) Assignee: ENEDYM INC., Hamilton (CA)

(*) Notice: Subject to any disclaimer, the term of this patent is extended or adjusted under 35 U.S.C. 154(b) by 426 days.

(21) Appl. No.: 15/406,149

(22) Filed: Jan. 13, 2017

(65) Prior Publication Data
US 2017/0214252 A1    Jul. 27, 2017

Related U.S. Application Data

(60) Provisional application No. 62/279,054, filed on Jan. 15, 2016.

(51) Int. Cl.
*H02J 7/00* (2006.01)
*H02J 7/34* (2006.01)
*H02M 3/04* (2006.01)
*H02M 3/24* (2006.01)
*H02M 1/00* (2006.01)

(52) U.S. Cl.
CPC .......... *H02J 7/0014* (2013.01); *H02J 7/0018* (2013.01); *H02J 7/345* (2013.01); *H02M 3/04* (2013.01); *H02M 3/24* (2013.01); *H02M 2001/0074* (2013.01); *Y02B 40/90* (2013.01); *Y02E 70/40* (2013.01); *Y02T 10/7055* (2013.01); *Y02T 50/54* (2013.01)

(58) Field of Classification Search
None
See application file for complete search history.

(56) References Cited

U.S. PATENT DOCUMENTS

| | | | | |
|---|---|---|---|---|
| 5,479,083 A | * | 12/1995 | Brainard | H01M 10/0413 320/121 |
| 2010/0117593 A1 | * | 5/2010 | Piccard | H02J 7/0018 320/104 |
| 2012/0043923 A1 | * | 2/2012 | Ikriannikov | H02J 1/10 320/103 |
| 2017/0264109 A1 | * | 9/2017 | Garnier | H02J 7/0018 |

OTHER PUBLICATIONS

Affanni et al., "Battery choice and management for new-generation electric vehicles", IEEE Trans. Ind. Electron., vol. 52, pp. 1343-1349, 2005.

(Continued)

*Primary Examiner* — Robert Grant
*Assistant Examiner* — Tynese V McDaniel
(74) *Attorney, Agent, or Firm* — Bereskin & Parr LLP/S.E.N.C.R.L., S.R.L.

(57) ABSTRACT

The integration of the auxiliary power module (APM) functionality into non-dissipative balancing hardware of a high voltage battery or supercapacitor pack enables a more cost-effective non-dissipative balancing system while maintaining a similar complexity in topologies. The system uses state-space equations and three control problems to balance high-voltage energy storage elements and charge low voltage energy storage elements. Two optimization based controllers are employed to optimize both balancing and charging simultaneously.

18 Claims, 11 Drawing Sheets

(56) References Cited

OTHER PUBLICATIONS

Lukic et al., "Energy storage systems for automotive applications", IEEE Trans. Ind. Electron., vol. 55, pp. 2258-2267, 2008.
Cao et al., "Battery balancing methods: A comprehensive review", Vehicle Power and Propulsion Conference (VPPC), 2008.
Kutkut et al., "Charge equalization for an electric vehicle battery system", IEEE Transactions on Aerospace and Electronic Systems, vol. 34, pp. 235-246, 1998.
Kutkut et al., "Design considerations for charge equalization of an electric vehicle battery system", IEEE Trans. Ind. Appl., vol. 35, pp. 25-35, 1999.
Moo et al., "Dynamic charge equalisation for series-connected batteries", IEE Proceedings Electric Power Applications, vol. 150, pp. 501-505, 2003.
Tang et al., "Selective buck-boost equalizer for series battery packs", IEEE Transactions on Aerospace and Electronic Systems, vol. 36, pp. 201-211, 2000.
Moore et al., "A review of cell equalization methods for lithium ion and lithium polymer battery systems", in SAE World Congress, 2011.
Lee et al., "Comparison of passive cell balancing and active cell balancing for automotive batteries", Vehicle Power and Propulsion Conference (VPPC), 2011.
Preindl et al., "Performance evaluation of battery balancing hardware", European Control Conference (ECC), 2013.
Andrea, "Battery Management Systems for Large Lithium Ion Battery Packs", Artech House, 2010.
McCurlie et al., "Simplified control for redistribution balancing systems using bidirectional flyback converters", IEEE Transportation Electrification Conference and Expo (ITEC), 2015.
Danielson et al., "Balancing of battery networks via constrained optimal control", American Control Conference (ACC), 2012.
Johnson et al., "Temperature dependent battery models for high-power-li-ion batteries", NREL, Tech. Rep., 2000.
Thomas et al., "Mathematical modeling of lithium batteries", Advances in Lithium-ion Batteries, W.A. van Schalkwijk and B. Scrosati, Eds., 2002, pp. 345-392.
Sikha et al., A mathematical model for a lithium-ion battery/electrochemical capacitor hybrid system", Journal of the Electrochemical Society", vol. 152, A1682-A1693, 2005.
Plett, "Extended kalman filtering for battery management systems of LiPB-based HEV batter packs part 1. background", Journal of Power Sources, vol. 134, pp. 252-261, 2004.
Bhangu et al., "Nonlinear observers for predicting state-of-charge and state-of-health of lead-acid batteries for hybrid-electric vehicles", IEEE Transactions on Vehicular Technology, vol. 54, pp. 783-794, 2005.
Charkhgard et al., "State-of-charge estimation for lithium-ion batteries using neural networks and ekf", IEEE Trans. Ind. Electron., vol. 57, pp. 4178-4187, 2010.
He et al., "State-of-charge estimation of the lithium-ion battery using an adaptive extended kalman filter based on an Improved thevenin model", IEEE Transactions on Vehicular Technology, vol. 60, pp. 1461-1469, 2011.
Kim et al., "SoC estimation and SoH prediction of a li-ion degraded battery based on an ekf combined with per-unit system", IEEE Transactions on Vehicular Technology, vol. 60, No. 9, pp. 4249-4260, 2011.
Shahriairi et al., "Online state of health estimation of vrla batteries using state of charge", IEEE Trans. Ind. Electron., vol. 60, pp. 191-202, 2013.
Andrea, "Battery Management Systems for Large Lithium Ion Battery Packs", pp. 64-88, Artech House, 2010.
Li-Ion BMS, "White Paper—Dissipative v. nondissipative balancing", http://liionbms.com/php/wp_passive_active_balancing.php.
Li-Ion BMS, "White Paper—Redistribution", http://liioinsbms.com/php/wp_redistribution.php.

* cited by examiner

ENERGY STORAGE BALANCING SYSTEM

PRIOR APPLICATION

This application claims the benefit of U.S. Provisional Patent Application No. 62/279,054 filed on Jan. 15, 2016, which is incorporated by reference herein in its entirety.

FIELD OF THE INVENTION

In general, the present application relates to energy storage systems and methods, and in particular systems and methods enabling non-dissipative balancing of energy storage elements.

BACKGROUND

Some electrified transportation systems, such as electric vehicles (EV) and plug-in hybrid electric vehicles (HEV), are moving towards drivetrains with high-power electric machines and inverters. These drivetrains often require energy storage systems with high voltage, high efficiency, and long lifetime (see, for example, A. Affanni, A. Bellini, G. Franceschini, P. Guglielmi, and C. Tassoni, "Battery choice and management for new-generation electric vehicles", IEEE Trans. Ind. Electron., vol. 52, pp. 1343-1349, 2005; and S. M. Lukic, J. Cao, R. C. Bansal, F. Rodriguez, and A. Emadi, "Energy storage systems for automotive applications", IEEE Trans. Ind. Electron., vol. 55, pp. 2258-2267, 2008, the entirety of which are incorporated herein by reference).

High voltage energy storage systems may be achieved by connecting energy storage elements, such as battery and/or supercapacitor cells, in series. The capacity of the stacked cells (i.e. the capacity of the individual energy storage elements) may differ due to internal (internal impedance and different self-discharge rate) and external (temperature variations) effects (see, for example, J. Cao, N. Schofield, and A. Emadi, "Battery balancing methods: A comprehensive review", in Vehicle Power and Propulsion Conference (VPPC), 2008, the entirety of which is incorporated herein by reference). This may result in differences in charging and discharging of cells, which may cause charge imbalances across the stack that can worsen over time.

A battery management system (BMS) may check each cell individually for over and undercharging. Otherwise, the cell life may be reduced nearly exponentially with the string length (see, for example, N. H. Kutkut, H. L. N. Wiegman, D. M. Divan, and D. W. Novotny, "Charge equalization for an electric vehicle battery system", IEEE Transactions on Aerospace and Electronic Systems, vol. 34, pp. 235-246, 1998; and "Design considerations for charge equalization of an electric vehicle battery system", IEEE Trans. Ind. Appl., vol. 35, pp. 28-35, 1999, the entirety of which are incorporated herein by reference). If the state-of-charge (SOC) of the individual energy storage cells is not equalized (i.e. balanced), the stack may contain cells with both low and high SOC. This can lead to only a fraction of the energy storage capacity being accessible.

SUMMARY

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

The described embodiments provide in an aspect, an energy storage system having a high-voltage section, a low-voltage section, a plurality of voltage converters and a controller. The high-voltage section can include a high-voltage bus and a plurality of high-voltage energy storage elements electrically connected to the high-voltage bus. The low-voltage section can include a low-voltage bus and a low-voltage energy storage element. The low-voltage bus can be electrically connectable to a low-voltage load. Each of the voltage converters can be electrically connected between one of the high-voltage energy storage elements and the low-voltage bus and operable to convert power between a high-voltage level of the high-voltage section and a low-voltage level of the low-voltage section. The controller can be coupled to the plurality of voltage controllers. The controller can be configured to determine an initial system charge state at a first sampling time, where the system charge state includes an element charge state corresponding to each of the energy storage elements that represents a charge level of that energy storage element and the system charge state defines a charge balance state representing relative element charge states of the high-voltage energy storage elements; calculate a plurality of potential charge balance states for a second sampling time based on the initial system charge state and a plurality of potential power transmission sets for the voltage converters, each potential charge balance state corresponding to one of the potential power transmission sets and the second sampling time being subsequent to the first sampling time; select one of the potential power transmission sets by minimizing a cost function, where the cost function is defined using an affine transformation of the system charge state and the cost function includes a balance state component that is minimized when the charge balance state is maximally balanced; determine power converter inputs using the selected power transmission set; and adjust the power transmission level of at least one of the voltage converters using the determined power converter inputs.

In some examples, the high-voltage section may operate at a high voltage level that is at least four times greater than a low voltage level of the low voltage section. In some examples, the high-voltage section may operate at a high voltage level that is at least ten times greater than a low voltage level of the low voltage section. In some examples, the high-voltage section may operate at a high voltage level that at least fifteen times greater than a low voltage level of the low voltage section.

In some embodiments, the controller can be configured to calculate at least one potential element charge state of the low voltage energy storage element at the second sampling time. The power converter inputs can determined based on the at least one potential element charge state of the low voltage energy storage element.

In some embodiments, the controller may be further configured to select a subsequent charge state of the low voltage energy storage element at the second sampling time from the at least one potential element charge state; calculate a charging power transmission set based on the initial system charge state and the subsequent charge state; determine a combined power transmission set by combining the charging power transmission set and the selected power transmission level set; and determine the power converter inputs from the combined power transmission set.

In some embodiments, the voltage converters may permit bidirectional current flow between the high-voltage section and the low-voltage section.

In some embodiments, the controller may be configured to calculate a plurality of potential element charge states of the low voltage storage element at the second sampling time, each potential element charge state corresponding to one of the potential power transmission sets, and the cost function may include a charging state component that is minimized when the element charge state of the low voltage energy storage element is at a maximum charging value.

In some embodiments, the cost function may include at least one adjustable minimization coefficient that defines a relative importance of the charging state component and the balance state component.

In some embodiments, the low voltage section may include a chopper element.

In some embodiments, the voltage converters may be unidirectional such that the voltage converters only permit current to flow from the high-voltage section to the low-voltage section.

In some embodiments, the power converter inputs can be determined to improve the charge balance state non-dissipatively.

In some embodiments, the low-voltage energy storage element may include a low-capacity capacitive energy storage element having a low-voltage energy storage capacity at least ten times less than a high-voltage energy storage capacity of any one of the high-voltage energy storage elements.

The described embodiments provide in an aspect, a method for balancing an energy storage unit that includes a plurality of high-voltage energy storage elements, a low-voltage section including a low-voltage bus and a low-voltage capacitive storage element and a plurality of voltage converters, each voltage converter electrically connected between one of the high-voltage energy storage elements and the low-voltage bus. The method can include determining an initial system charge state at a first sampling time, where the system charge state includes an element charge state corresponding to each of the energy storage elements that represents a current charge level of that energy storage element and the system charge state defines a charge balance state representing relative element charge states of the high-voltage energy storage elements; calculating a plurality of potential charge balance states for a second sampling time based on the initial system charge state and a plurality of potential power transmission sets for the voltage converters, each potential charge balance state corresponding to one of the potential power transmission sets and the second sampling time being subsequent to the first sampling time; selecting one of the potential power transmission sets by minimizing a cost function, where the cost function is defined using an affine transformation of the system charge state and the cost function includes a balance state component that is minimized when the charge balance state is maximally balanced; determining power converter inputs using the selected power transmission set; and adjusting the power transmission level of at least one of the voltage converters using the determined power converter inputs.

In some examples, the high-voltage section may operate at a high voltage level that is at least four times greater than a low voltage level of the low voltage section. In some examples, the high-voltage section may operate at a high voltage level that is at least ten times greater than a low voltage level of the low voltage section. In some examples, the high-voltage section may operate at a high voltage level that at least fifteen times greater than a low voltage level of the low voltage section.

In some embodiments, the low voltage section further includes a low voltage energy storage element; the method may further include calculating at least one potential element charge state of the low voltage energy storage element at the second sampling time; and the power converter inputs can be determined based on the at least one potential element charge state of the low voltage energy storage element.

In some embodiments, the method may further include selecting a subsequent charge state of the low voltage energy storage element at the second sampling time from the at least one potential element charge state; calculating a charging power transmission set based on the initial system charge state and the subsequent charge state; determining a combined power transmission set by combining the charging power transmission set and the selected power transmission level set; and determining the power converter inputs from the combined power transmission set.

In some embodiments, the power converter inputs can be determined to provide bidirectional current flow between the high-voltage section and the low-voltage section.

In some embodiments, the method may include calculating a plurality of potential element charge states of the low voltage storage element at the second sampling time, each potential element charge state corresponding to one of the potential power transmission sets; and the cost function can include a charging state component that is minimized when the element charge state of the low voltage energy storage element is at a maximum charging value.

In some embodiments, the cost function can include at least one adjustable minimization coefficient that defines a relative importance of the charging state component and the balance state component.

In some embodiments, the method may include controlling dissipation from the low voltage section using a chopper element.

In some embodiments, the power converter inputs can be determined to only permit current to flow from the high-voltage section to the low-voltage section Embodiments described herein may provide methods, systems and/or apparatuses to enable the implementation of a non-dissipative battery balancing system. Embodiments of the systems described herein may integrate multiple necessary functionalities of electrified transport systems (e.g. electric, hybrid electric, plug-in hybrid vehicles; railway; more-electric ships; more-electric airplanes) into a single power electronic converter system. In some electrified transport systems, an auxiliary power module (APM) can be used to produce a lower voltage for auxiliary systems (e.g. electronics, AC, etc.). In embodiments described herein, APMs may be modified to balance the charge between cells (i.e. between energy storage elements) as an additional function. Embodiments described herein may be implemented using unidirectional and/or bi-directional DC-DC power electronic converters. In general, embodiments described herein may enable more energy efficient, non-dissipative battery balancing system using existing electronic systems. Such embodiments may permit improved battery pack utilization for little or no extra cost as compared with existing APMs.

DRAWINGS

For a better understanding of the various embodiments described herein, and to show more clearly how these various embodiments may be carried into effect, reference will be made, by way of example, to the accompanying drawings which show at least one example embodiment and which will now be briefly described.

DETAILED DESCRIPTION

Figure 1:
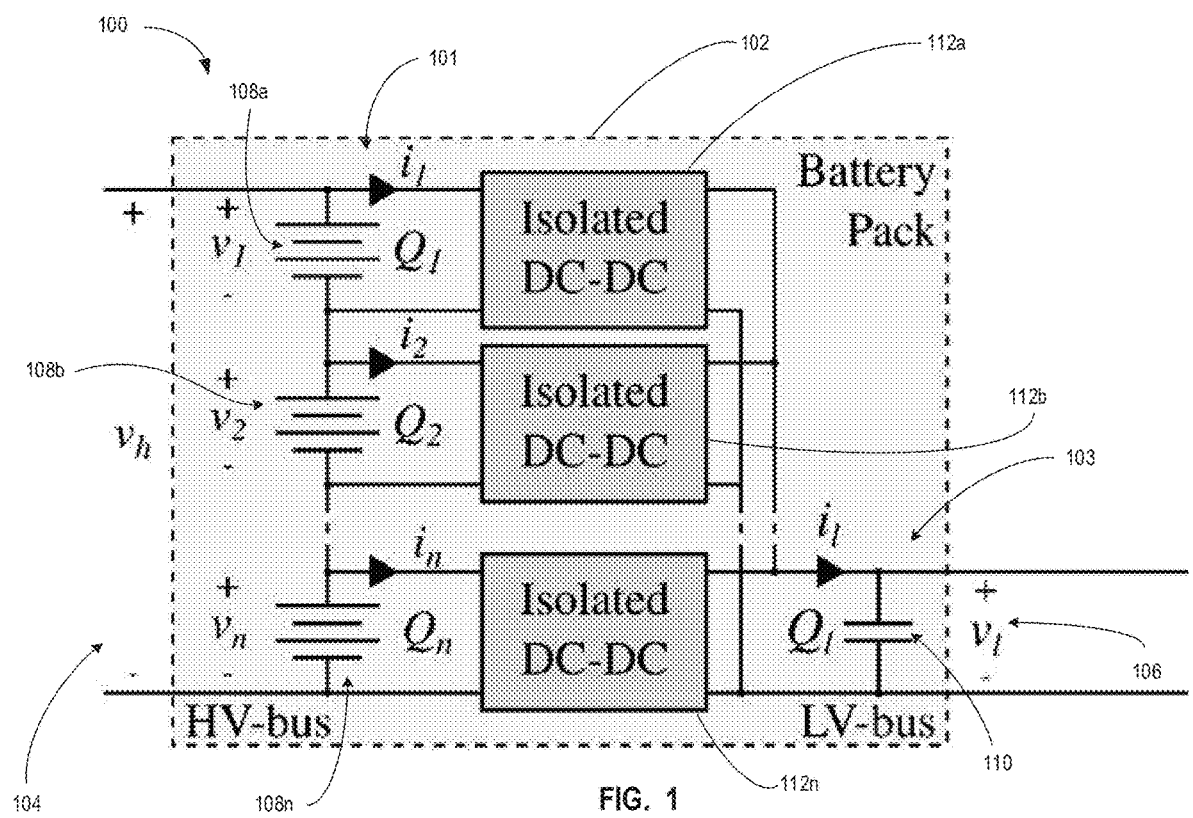
FIG. 1 illustrates an energy storage system in accordance with an example embodiment.

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

In general, the embodiments described herein relate to energy storage systems and methods. In particular, embodiments described herein relate to energy storage systems and methods that may provide improved energy balancing between energy storage elements and/or improved charging of energy storage elements. While the example embodiments herein are described in relation to systems using batteries as energy storage elements, a skilled reader will appreciate that embodiments of the systems and methods described herein may also be implemented in supercapacitor systems.

High voltage energy storage systems may include a plurality of connected energy storage elements (for long-term/non-transient energy storage), such as battery and/or supercapacitor cells. These energy storage elements may be connected in series. If the state-of-charge (SOC) of the individual energy storage elements is not equalized/balanced, the accessible capacity of the energy storage system may be limited. Accordingly, embodiments described herein may provide systems and methods that can be used to improve the charge balance state of the energy storage system (i.e. how balanced the states-of-charge of the individual energy storage elements are).

Techniques for balancing the SOC of energy storage elements may fall into two classes; dissipative techniques and non-dissipative techniques. In dissipative balancing, excess charge can be drawn from one or more cells (i.e. energy storage elements) having relatively higher or the highest SOC and dissipated through shunt resistors. In some cases, dissipative balancing may be active (e.g. a controller imposes currents in balancing links). In other cases, dissipative balancing may be passive (e.g. the system relies on the voltage differences of the cells to cause current flow). Passive dissipative balancing may have a limited effectiveness for some battery systems, such as systems using Lithium-Ion cells, because Lithium-Ion cells may have a flat voltage profile with respect to their element charge state (SOC).

Non-dissipative balancing techniques are typically active. These techniques may use power electronic links to move charge between cells (see, for example, C. S. Moo, Y. C. Hsieh, and I. S. Tsai, "Dynamic charge equalisation for series-connected batteries", *IEE Proceedings Electric Power Applications*, vol. 150, pp. 501-505, 2003; M. Tang and T. Stuart, "Selective buck-boost equalizer for series battery packs", *IEEE Transactions on Aerospace and Electronic Systems*, vol. 36, pp. 201-211, 2000; S. Moore and P. Schneider, "A review of cell equalization methods for lithium ion and lithium polymer battery systems", in *SAE World Congress,* 2001; W. C. Lee, D. Drury, and P. Mellor, "Comparison of passive cell balancing and active cell balancing for automotive batteries", in *Vehicle Power and Propulsion Conference (VPPC),* 2011; the entirety of which are incorporated herein by reference).

In some cases, non-dissipative balancing may be significantly more energy efficient as compared to dissipative balancing techniques. Non-dissipative balancing can achieve a lower energy-loss-to-balance (e2b) ratio than dissipative balancing. Non-dissipative balancing may also achieve the same speed performance, defined by time-to-balance (t2b), as compared to dissipative balancing (see, for example, M. Preindl, C. Danielson, and F. Borrelli, "Performance evaluation of battery balancing hardware", in *European Control Conference (ECC)*, 2013, the entirety of which is incorporated herein by reference).

Non-dissipative balancing circuits may also be capable of maximizing the equivalent capacity of an energy storage element stack by maintaining the SOC of all cells substantially equal/balanced at all time (or at most times). This technique may be referred to as redistributive balancing and can involve making the charge in larger cells available before depleting smaller cells. In some cases, this may require balancing power transfer links with a high current rating (10 A to 100 A compared to 10 mA to 1 A for balancing) (see, for example, D. Andrea, *Battery Management Systems for Large Lithium Ion Battery Packs*. Artech House, 2010, the entirety of which is incorporated herein by reference).

In practice, original equipment manufacturers (OEM's) often hesitate to implement non-dissipative balancing topologies due to cost (see for example S. M. Lukic, J. Cao, R. C. Bansal, F. Rodriguez, and A. Emadi, "Energy storage systems for automotive applications", *IEEE Trans. Ind. Electron.*, vol. 55, pp. 2258-2267, 2008, the entirety of which is incorporated herein by reference). Designing and implementing inexpensive active battery balancing systems can be challenging because of the system complexity (requiring sensors, local controllers, etc.). Additionally, the overall power rating required can be in the order of several kW.

Embodiments described herein may integrate additional functionality in the battery balancing hardware that may mitigate the costs of such systems. Embodiments described herein may use a non-dissipative capacitive storage element topology that performs efficiently in terms of both time to balance (t2b) and energy to balance (e2b) (see for example, M. Preindl, C. Danielson, and F. Borrelli, "Performance evaluation of battery balancing hardware", in *European Control Conference (ECC)*, 2013, the entirety of which is incorporated herein by reference).

To redistribute charge, some embodiments described herein using a capacitive storage element topology may be able to pull and/or push charge from and/or to all cells (i.e. energy storage elements) substantially simultaneously. Embodiments described herein can also be used to supply and/or discharge a galvanic isolated load. Accordingly, embodiments described herein may provide a degree of freedom that can be used to charge a low voltage battery pack and may replace/improve upon a conventional auxiliary power module (APM).

In embodiments described herein, an energy storage system may include a high-voltage section, a low-voltage section and a voltage conversion (or power conversion section). The high-voltage section may operate at a high voltage level that is much greater than the low voltage level of the low-voltage section. The high voltage level may be five, ten, fifteen or more times greater than the low-voltage level.

For example, the high voltage section may operate at a high voltage level greater than 100V while the low voltage section operates at a low voltage level less than 50V. The high voltage section may operate at greater than 100V (e.g. operating at about 200V) in some examples. In some examples, the high voltage section may operate at greater than 500V (e.g. operating at about 800V).

The low voltage section may operate at less than 50V (e.g. 48V) in some examples. The low voltage section may operate at less than 25V (e.g. 24V) in some examples. The low voltage section may operate at less than 15V (e.g. 12V) in some examples.

The high-voltage section can include a high-voltage bus and a plurality of high-voltage energy storage elements electrically connected to the high-voltage bus. The plurality of high-voltage energy storage elements can be connected in series (i.e. stacked) to provide high-voltage energy storage. The high voltage energy storage elements may have capacity levels used to provide longer term storage of energy for the energy storage system. The high voltage level of the high voltage section may be determined based on the total stack voltage of the high-voltage energy storage elements.

The low-voltage section can include a low-voltage bus and a low-capacity energy storage element such as a capacity. The low-voltage bus may be electrically connectable to a dissipative load. The low-capacity capacitive energy storage element may have capacity levels substantially smaller (i.e. orders of magnitude smaller) than the high-voltage energy storage elements.

In some embodiments, the low-voltage section may also include a low-voltage energy storage element that may store power at a low voltage. The low-voltage energy storage element may have a capacity level similar to the high-voltage energy storage elements (and substantially i.e. orders of magnitude greater than the low-voltage capacitive storage element). For example, a batter or ultra-capacitor may be used as the low-voltage energy storage element.

The low-voltage energy storage element may be charged by power transmitted from the high-voltage energy storage elements. The low-voltage energy storage element may also be used to supply power to a load connected to the low-voltage bus. In some embodiments, the low voltage section may also include a chopper element.

The voltage conversion section may include a plurality of voltage converters. Each voltage converter can be electrically connected between one of the high-voltage energy storage elements and the low-voltage bus. The high-voltage section may be used to store power for the energy storage system which can then be converted to low voltage power by the power conversion section and used to provide power to the load. The voltage converters may also be used as power transmission units or power transmission links to transfer power between the high-voltage section and the low-voltage section (and to and from individual energy storage elements in the high-voltage section, and capacitive storage element and/or larger capacity energy storage elements in the low-voltage section in embodiments).

The energy storage system may also include a controller. The controller can be coupled to the plurality of voltage converters to control operation of the voltage converters. The controller may also be coupled to other components, such as the high-voltage energy storage elements, capacitive storage element, low-voltage energy storage elements and/or related terminals. The controller can be configured to perform embodiments of various methods described herein for balancing an energy storage system and/or charging an energy storage system.

The controller may be configured to control operation of the voltage converters to improve balance of the charge states of the high voltage energy storage elements (to improve the charge balance state of the system). The controller may also be configured to control operation of the voltage converters to improve an element charge state of energy storage elements in the low voltage section. In some cases, the controller may be configured to control operation of the voltage converters to improve both the charge state balance (of the high-voltage energy storage elements) and the element charge state of a low voltage energy storage element, or to improve an overall system operation function that takes into account both the charge state balance and the element charge state of a low voltage energy storage element.

The controller may determine an initial system charge state at a first sampling time. The initial system charge state may represent the present system charge state of the energy storage system. The system charge state may include an element charge state corresponding to each of the energy storage elements in the energy storage system (i.e. include a component representing the state of charge of each element). The balance between the element charge states of the high-voltage energy storage elements may be said to define a charge balance state of the energy storage system. The charge balance state may reflect the relative element charge states of the high-voltage energy storage elements with respect to one another.

The controller may calculate a plurality of potential charge balance states for a second sampling time. The second sampling time can be subsequent to the first sampling time and may be an expected future sampling time. The plurality of potential charge balance states can be calculated using a plurality of potential power transmission sets for the voltage converters. Each potential charge balance state may correspond to one of the potential power transmission level sets.

A power transmission set may define the power transmitted by each of the voltage converters between the first sampling time and the second sampling time. Accordingly, each potential charge balance state may be calculated to reflect an estimate of the charge balance state that would result from the voltage converters transmitting the power defined by the corresponding power transmission level set.

The controller may then select one of the potential power transmission sets. The selected power transmission set can be used to define control inputs for the voltage converters to adjust the power level transmitted by at least one of the voltage converters.

The selected power transmission level set may be determined using a cost function that is defined based on the system charge state. The controller may determine a lowest cost of the potential power transmission sets using the cost function. The potential power transmission set corresponding to the lowest cost may then be selected.

The cost function may be defined using an affine or state space transformation of the system charge state. The cost function can include a balance state component that is minimized when the charge balance state is maximally balanced (i.e. when the states of charge of the high voltage energy storage elements are most balanced).

The controller may also take into account the element charge state of low voltage energy storage element(s). In some cases, the cost function may include a charging state component based on the element charge state of a low voltage energy storage element. The charging state component may be minimized when the element charge state of the low voltage storage element is at a maximum charging value. Accordingly, the controller may determine the power transmission set by taking into account the element charge state of the low voltage energy storage element and the charge balance state interdependently.

In other cases, the controller may determine the transmission power set to include a balance power transmission set that is determined based on the charge balance state and a charging power transmission set that is determined based on the element charge state of the energy storage element in the low-voltage section. The balance power transmission set and charging power transmission set may be determined independently from one another. This may facilitate calculation of the individual power transmission sets.

In some cases, the balance power transmission set can be determined to avoid affecting the element charge state of the energy storage element in the low-voltage section. Similarly, the charging power transmission set may be determined to avoid affecting the charge balance state. This may permit the balance power transmission set and charging power transmission set to be determined independently without impacting one another. For example, the balance power transmission set and charging power transmission set may be determined at different sampling rates.

The low-voltage section may have various configurations in different embodiments, as shown below in FIGS. 1-4. Each such configuration of the low-voltage section may provide different operational characteristics.

Embodiments described herein may be implemented using unidirectional or bidirectional DC-DC power electronic converters. In some embodiments, the voltage converters may be bi-directional, permitting current flow from the high-voltage section to the low voltage section and from the low-voltage section to the high-voltage section. In other embodiments, the voltage converters may be unidirectional, only permitting current flow from the high-voltage section to the low-voltage section.

Embodiments described herein may provide more energy efficient, non-dissipative battery balancing system using existing electronic systems (e.g. existing auxiliary power modules). Accordingly, embodiments described herein may provide higher battery pack utilization for little or no extra cost.

Referring now to FIG. 1, shown therein is an example embodiment of an energy storage system 100. System 100 as shown is implemented as a battery balancing auxiliary power unit (APU). System 100 includes a high voltage (HV) bus connection 104 and a low voltage (LV) bus connection 106.

System 100 includes a HV battery (or supercapacitor) pack 102 with n energy storage elements 108a, 108b . . . 108n in the high-voltage section 101. The storage elements 108 can be connected in series as shown in FIG. 1. The n+1-th storage element 110 is connected to a galvanic isolated LV bus 106. Each energy storage element 108 may be implemented as either a single cell or a module with multiple cells connected in parallel and/or series.

In the example system 100 shown in FIG. 1, the low-voltage section 103 does not include an LV energy storage element with a charge capacity level similar to the high-voltage energy storage elements 108. However, the low-voltage section 103 includes a capacitive storage element 110 with a charge capacity substantially smaller than the high-voltage energy storage elements 108. The capacitive storage element 110 may be referred to as a low-capacity energy storage element or a low-capacity capacitive energy storage element.

Figure 2:
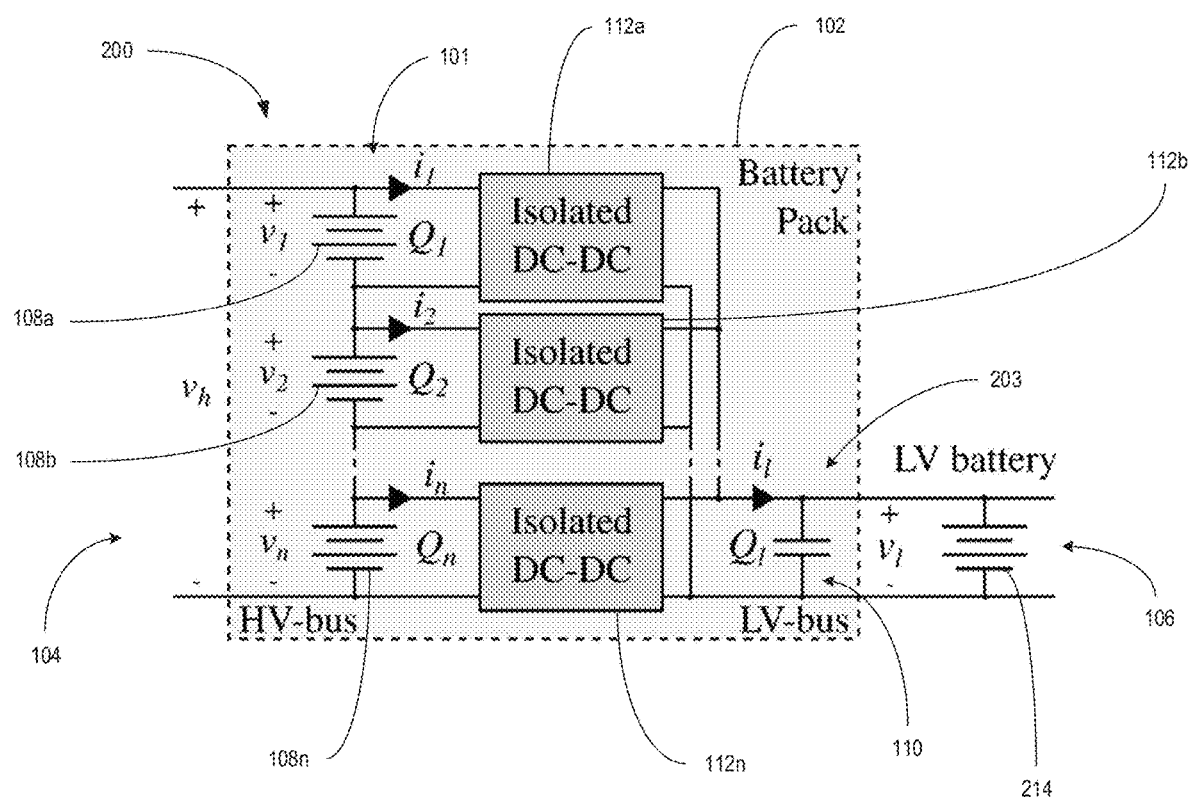
FIG. 2 illustrates another energy storage system in accordance with another example embodiment.
Figure 3:
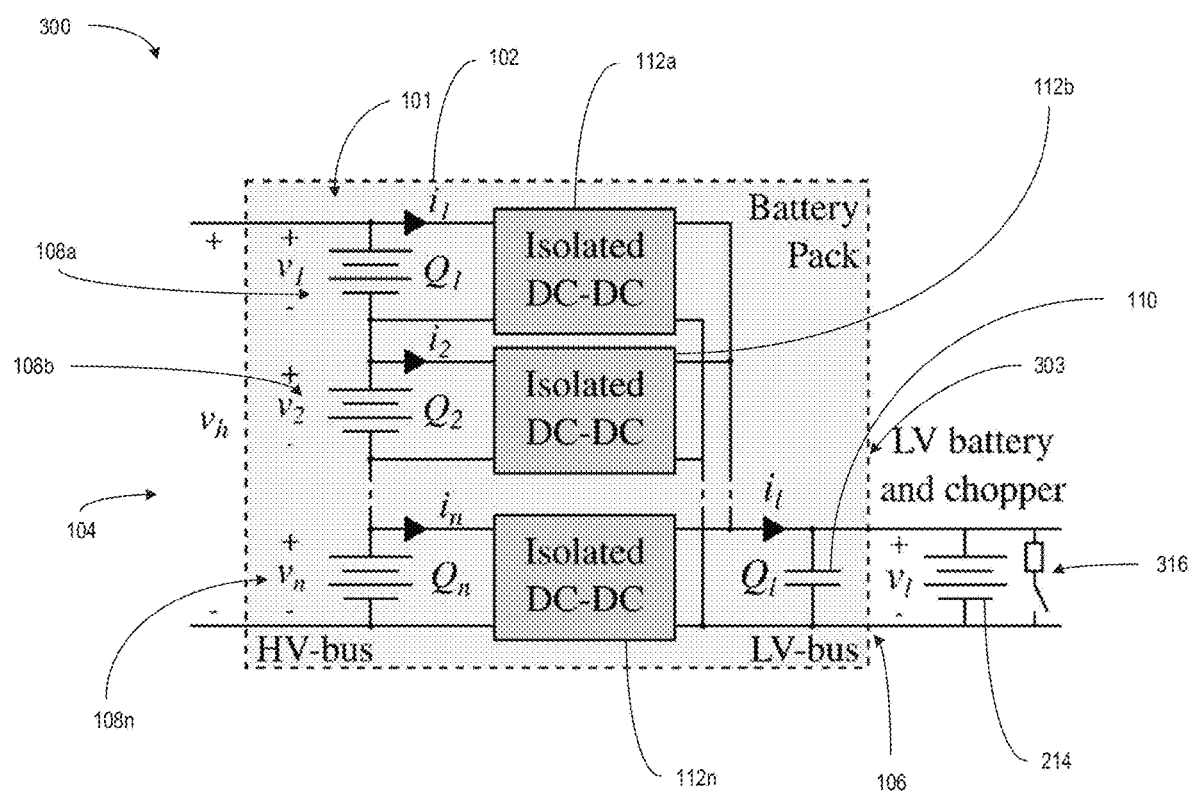
FIG. 3 illustrates another energy storage system in accordance with a further example embodiment.
Figure 4:
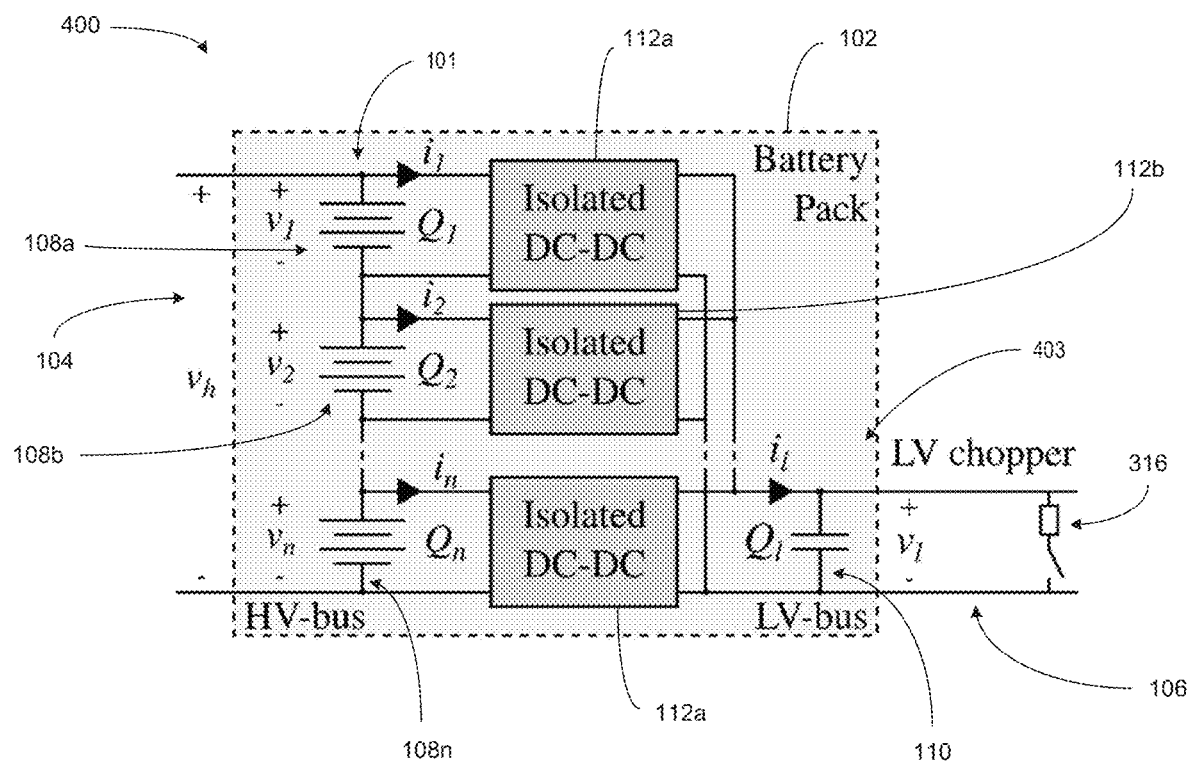
FIG. 4 illustrates another energy storage system in accordance with a further example embodiment.

In other embodiments, such as system 200 shown in FIG. 2 and system 300 shown in FIG. 3, the low-voltage sections 203/303 respectively may include an LV energy storage element 214 with capacity level similar to the high-voltage energy storage elements 108. In some embodiments, such as system 300 shown in FIG. 3 and system 400 shown in FIG.

4, the low-voltage sections 303/403 respectively may include a chopper element 316.

A low capacity capacitive energy storage element 110 may be used to stabilize the voltage of the low-voltage section 103. For example, the low capacity capacitive energy storage element 110 may stabilize the voltage level of the low-voltage section 103 in the absence of a larger storage element such as LV energy storage element 214. When the system includes an LV energy storage element 214 of a larger storage element such as a battery and/or ultracapacitor, the low capacity capacitive energy storage element 110 may still be used to support fast power electronic pulses. The energy storage capability of the low capacity capacitive energy storage element 110 may be orders of magnitude below the energy storage capability of an LV energy storage element 214 such as a battery.

The charge of the j-th energy storage element 108 of the stack can be defined by $Q_j x_j(t)$. The charge is the product of the state of charge (soc) $x_j(t) \in R_{\geq 0}$ and the rated capacity $Q_1 \in R_{>0}$ of the element 108. $t \in N_{\geq 0}$ is the discrete sampling time. A system charge state can be defined based on the charge of each of the energy storage elements 108 and the energy storage elements (i.e. low-capacity capacitive energy storage element 110 and/or LV energy storage element 214) in the low-voltage section 103. The system charge state can be defined as a SOC vector as shown in Equation (1):

$$x(t)=[x_1(t), \ldots, x_j(t), \ldots, x_n(t), x_{n+1}(t)=x_l(t)]' \in R_{\geq 0}^{n+1}. \quad (1)$$

Each HV energy storage element 108 can be electrically connected to the LV bus 106 (and LV capacitive storage element 110) using a voltage converter 112. Each voltage converter 112 may be a galvanic isolating DC-DC converter 112. The converters 112 may be modeled as ideal DC transformers that transfer power $p_k(t)$ in the k-th link between the high-voltage section 101 and the low-voltage section 103. The input voltage $v_{k,in} \in R_{>0}$ and output voltage $v_{k,out} \in R_{>0}$ of the links may be assumed to be slow varying with respect to the sampling period T. Thus, the k-th link 112 drives the input current $$i_{k,in}(t) = \frac{p_k(t)}{v_{k,in}}$$

and the output current $$i_{k,out}(t) = \frac{p_k(t)}{v_{k,out}}.$$

The set of link power for all of the converters 112 may be defined as a transmission power set. The transmission power set can be defined as a vector of link power as shown in Equation (2)

$$p(t)=[p_1(t), \ldots, p_j(t), \ldots, p_n(t)]' \in R^n. \quad (2)$$

A dynamic model can be developed to represent the system charge state of system 100. For example, dynamic models may be developed based on the models described in M. Preindl, C. Danielson, and F. Borrelli, "Performance evaluation of battery balancing hardware", in *European Control Conference (ECC)*, 2013; L. McCurlie, M. Preindl, P. Malysz, and A. Emadi, "Simplified control for redistributive balancing systems using bidirectional flyback converters", in *IEEE Transportation Electrification Conference and Expo (ITEC)*, 2015; and C. Danielson, F. Borrelli, D. Oliver, D. Anderson, M. Kuang, and T. Phillips, "Balancing of battery networks via constrained optimal control", in *American Control Conference (ACC)*, 2012 the entirety of each of which are incorporated herein by reference. Changes to system charge state may be determined based on the present or initial system charge state and the power transferred by the voltage converters 112 (i.e. a power transmission set). The system charge state (SOC) can be expressed as a function of the power transferred over the links 112:

$$x(t+1)=x(t)+Bp(t). \quad (3)$$

The matrix B may define a relationship between the transmission power set p(t) and the system charge state x(t). The matrix B may account for the capacity of the HV energy storage elements 108 and low voltage energy storage elements 110/214, as well as the topology of the system (i.e. the links between the storage elements defined by the voltage converters 112).

The parameter matrix for the energy storage system 100 can be defined by $BQ^{-1}T \in R^{(n+1) \times n}$, where the charge capacity matrix Q is shown in Equation (4)

$$Q = \begin{bmatrix} Q_1 & 0 & \ldots & 0 & 0 \\ 0 & Q_2 & \ldots & 0 & 0 \\ \vdots & \vdots & & \vdots & \vdots \\ 0 & 0 & \ldots & Q_n & 0 \\ 0 & 0 & \ldots & 0 & Q_l \end{bmatrix} \in R^{(n+1) \times (n+1)}, \quad (4)$$

The topology matrix T describes a connected graph. The topology matrix T can define how the links (i.e. the voltage converters 112) connect the energy storage elements 108 with each other and with the LV bus 106 (see, for example, M. Preindl, C. Danielson, and F. Borrelli, "Performance evaluation of battery balancing hardware", in *European Control Conference (ECC)*, 2013; and C. Danielson, F. Borrelli, D. Oliver, D. Anderson, M. Kuang, and T. Phillips, "Balancing of battery networks via constrained optimal control", in *American Control Conference (ACC)*, 2012, the entirety of each of which is incorporated herein by reference). In embodiments described herein, a battery balancing apm topology can be obtained by electrically connecting each HV element 108 to the LV bus 106. Using the convention that the current is positive when it flows from the HV section 101 to the LV section 103, the topology matrix can be defined as $$T = \begin{bmatrix} -\frac{1}{v_1} & 0 & \ldots & 0 \\ 0 & -\frac{1}{v_2} & \ldots & 0 \\ \vdots & \vdots & & \vdots \\ 0 & 0 & \ldots & -\frac{1}{v_n} \\ \frac{1}{v_l} & \frac{1}{v_l} & \ldots & \frac{1}{v_l} \end{bmatrix} \in R^{(n+1) \times n}. \quad (5)$$

The energy storage system model shown in Equation (3) uses the SOC as a system state. However, the state of charge x of individual energy storage elements 108 may not be measured directly. The system charge state may be determined using terminal voltages corresponding to the energy storage elements 108. For example, the SOC vector defined by equation (1) can be mapped into a vector of terminal voltages $v(t)=[v_1(t), \ldots, v_n(t), v_l(t)] \in R_{>0}^{n+1}$.

For energy storage elements 108 such as batteries, the relationship between the terminal voltage and the state of charge, i.e. $v(t)=c(x(t))$ may be highly nonlinear. The relationship may depend on past operation, temperature, internal effects of the battery chemistry, etc. (see, for example, V. H. Johnson, A. A. Pesaran, and T. Sack, "Temperature dependent battery models for high-power li-ion batteries", NREL, Tech. Rep., 2000; K. Thomas, J. Newman, and R. Darling, "Mathematical modeling of lithium batteries", in *Advances in Lithium-Ion Batteries*, W. A. van Schalkwijk and B. Scrosati, Eds., 2002, pp. 345-392; G. Sikha, R. E. White, and B. N. Popov, "A mathematical model for a lithium-ion battery/electrochemical capacitor hybrid system", *Journal of The Electrochemical Society*, vol. 152, A1682-A1693, 2005).

In embodiments described herein, the element charge state (SOC) of each energy storage element 108 may be assumed to be determinable, i.e. estimateable, with sufficient precision. Various techniques may be used to estimate the state-of-charge for energy storage elements 108 as will be appreciated by a person of skill in the art. Details on estimating the state-of-charge for battery cells can be found in, for example, G. L. Plett, "Extended kalman filtering for battery management systems of LiPB-based HEV battery packs part 1. background", *Journal of Power Sources*, vol. 134, pp. 252-261, 2004; B. S. Bhangu, P. Bentley, D. A. Stone, and C. M. Bingham, "Nonlinear observers for predicting state-of-charge and state-of-health of lead-acid batteries for hybrid-electric vehicles", *IEEE Transactions on Vehicular Technology*, vol. 54, pp. 783-794, 2005; M. Charkhgard and M. Farrokhi, "State-of-charge estimation for lithium-ion batteries using neural networks and ekf", *IEEE Trans. Ind. Electron.*, vol. 57, pp. 4178-4187, 2010; H. He, R. Xiong, X. Zhang, F. Sun, and J. Fan, "State-of-charge estimation of the lithium-ion battery using an adaptive extended kalman filter based on an improved thevenin model", *IEEE Transactions on Vehicular Technology*, vol. 60, pp. 1461-1469, 2011; J. Kim and B. H. Cho, "SoC estimation and SoH prediction of a li-ion degraded battery based on an ekf combined with a per-unit system", *IEEE Transactions on Vehicular Technology*, vol. 60, no. 9, pp. 4249-4260, 2011; M. Shahriairi and M. Farrokhi, "Online state of health estimation of vrla batteries using state of charge", *IEEE Trans. Ind. Electron.*, vol. 60, pp. 191-202, 2013; the entirety of each of which is incorporated herein by reference.

The system charge state (SOC) and the link power transfer values can be constrained as shown in Equation (6)

$$x(t) \in X, p(t) \in P, \quad (6)$$

The system charge state and the link power transfer values may be constrained to avoid damaging the energy storage elements 108/214 and storage elements 110 and power transfer links (i.e. voltage converters 112). In embodiments described herein, the state of charge of the energy storage elements 108/214 and storage elements 110 may be normalized to the range of [0,1]. An empty energy storage element/cell $108j$ can be defined to be empty when $x_j(t)=0$ and full when $x_j(t)=1$. Hence, the constraint on the system charge state can be defined as $X=[0,1]^{n+1}$.

The limits of the link currents can depend on the DC-DC converters 112 used in a particular implementation. Each DC-DC converter 112 has a minimum rated power $P_{k,min}$ and maximum rated power $P_{k,max}$. In some cases, the converters 112 across the stack can have different rated powers (different types of converters, available cooling, etc.). The power transmission components of the power transmission sets can be constrained as shown in Equation (7)

$$P=\{p \subseteq R^n | P_{k,min} \leq p_k \leq P_{k,max} \forall k \in \{1, \ldots, n\}\} \quad (7)$$

If a converter 112 is unidirectional, the minimum power is zero, i.e. $P_{k,min}=0$.

In some embodiments, other constraints may also be imposed on the power conversion section in addition to the minimum and maximum current. For example, the total power that is dissipated through the voltage converters 112 during a balancing operation may be limited to prevent the stack from overheating (see, for example, M. Preindl, C. Danielson, and F. Borrelli, "Performance evaluation of battery balancing hardware", in *European Control Conference (ECC)*, 2013; and C. Danielson, F. Borrelli, D. Oliver, D. Anderson, M. Kuang, and T. Phillips, "Balancing of battery networks via constrained optimal control", in *American Control Conference (ACC)*, 2012, the entirety of each of which is incorporated herein by reference in their entirety).

The energy storage system 100 may also include a controller (not shown) that may be coupled to components of pack 102. The controller may be configured to control operation of the voltage converters 112 to improve balance of the charge states of the high voltage energy storage elements 108 (to improve the charge balance state of the system). The controller may also be configured to control operation of the voltage converters 112 to improve an element charge state of a low voltage storage element 110 and/or energy storage element 214. In some cases, the controller may be configured to control operation of the voltage converters 112 to improve both the charge state balance and the element charge state of a low voltage energy storage element, or to improve an overall system operation function that takes into account both the charge state balance and the element charge state of a low voltage energy storage element.

The controller may be a programmable logic controller (PLC), a microcontroller or any other circuit assembly that can be used to enable precise control of the operation of the systems 100/200/300/400 and voltage converters 112. The controller can be configured to receive as inputs at least one sensed operating parameter from the systems 100/200/300/400. This may include one or more of terminal voltages corresponding to the storage elements 108/110/214, operating parameters of a chopper 316 and of voltage converters 112. The operating parameters may be measured using sensors. The controller can further configured to generate control signals for components of the systems 100/200/300/400. For example, the controller can generate control signals for the voltage converters 112 and/or chopper 316.

Balancing and Power Supply

The charge balance state of the energy storage system 100 represents the relative element charge states of the HV energy storage elements 108. The energy storage system 100 is said to have a balanced HV s (i.e. the charge balance state is balanced) when all n HV elements 108 in the HV section 101 have the same element charge state (SOC) $x_j(t)$. Equation (8) illustrates a definition of a balanced high-voltage section:

$$x(t) \in X_b = \{x \in R^{n+1} | x_j = x_k \forall j, k \in \{1, \ldots, n\}\}. \quad (8)$$

The HV elements 108 supply the LV bus 106 and an isolated LV storage element 110 with energy to realize the apm functionality. An LV energy storage element 110/214 has a charging state defined by the state of charge/element charge state of that element. A charged charging state of a LV energy storage element can be defined according to Equation (9)

$$x(t) \in X_c = \{x \in R^{n+1} | x_{n+1} = x_f = 1\}. \tag{9}$$

The system 100 can be said to be balanced (i.e. the charge balance state of the high voltage energy storage elements is balanced) and the low voltage element 110 is said to be charged if $x(t) \in X_b \cap X_c$. An affine transformation $\tilde{x}$ of the system charge state x can be defined according to Equation (10):

$$\tilde{x}(t) = Lx(t) - r, \tag{10}$$

where $r = [0, \ldots, 0, 1]' \in R^n$ and $$L = \begin{bmatrix} 1 & -1 & 0 & \ldots & 0 & 0 & 0 \\ 0 & 1 & -1 & \ldots & 0 & 0 & 0 \\ \vdots & \vdots & \vdots & & \vdots & \vdots & \vdots \\ 0 & 0 & 0 & \ldots & 1 & -1 & 0 \\ 0 & 0 & 0 & \ldots & 0 & 0 & 1 \end{bmatrix} \in R^{n \times (n+1)}. \tag{11}$$

The transformed system charge state $\tilde{x}$ may simplify calculation of the present system charge state and potential subsequent system charge states and corresponding power transmission level sets.

The following results can be proven for the transformed state) $\tilde{x}(t)$. Consider the matrices $$R = \begin{bmatrix} 0_{n-1 \times n-1} & 0_{n-1} \\ 0'_{n-1} & 1 \end{bmatrix} \in R^{n \times n}, \tag{12}$$

and $\overline{R} = I - R \in R^{n \times n}$ are introduced to simplify the notation.

Proposition 1 [Balanced HV Elements]

A system charge state may be said to be balanced (i.e. $x(t) \in X_b$) if and only if the high voltage portion (i.e. high voltage components) of the transformed system charge state is null (i.e. $\overline{R}\tilde{x}(t) = 0_n$). If the system charge state is balanced, the element charge state of each of the high voltage energy storage elements 108 should be identical (or substantially identical). Accordingly, the corresponding high voltage components in the transformed system charge state should be null/zero.

Proof of Proposition 1

A vector $\phi = \overline{R}\tilde{x}(t)$ has high voltage components $\phi_j = \tilde{x}_j = x_j - x_{j+1}$ for all $j \in \{1, \ldots, n-1\}$ and a low voltage component $\phi_n = 0$. That is, the transformed balance charge state vector is independent of the element charge state of an LV storage element $x_l(t)$. Hence $\phi = 0_n$ implies that all HV energy storage elements 108 have the same SOC, i.e. $x(t) \in X_b$. If there exist a $\phi_j \neq 0$ (i.e. if any of the HV energy storage elements 108 have an element charge state different from another HV energy storage element 108) then $x(t) \notin X_b$ (i.e. the charge balance state is not balanced).

Charging of an LV energy storage element 110/214 can also be represented using the transformed system charge state $\tilde{x}(t)$.

Proposition 2 [Charged LV Element]

A system charge state is charged (i.e. $x(t) \in X_c$) if and only if the low-voltage components of the transformed system charge state are null/zero (i.e. $R\tilde{x}(t) = 0_n$)

Proof of Proposition 2

The vector $\theta = R\tilde{x}(t)$ has null high voltage components $\theta_j = 0$ for all $j \in \{1, \ldots, n-1\}$ and a low voltage component $\theta_n = \tilde{x}_n = x_l - 1$. The vector $\theta = R\tilde{x}(t)$ is accordingly independent of the SOC of the HV elements 108. Hence $\theta = 0_n$ implies that the charge state of the LV storage element is charged $x_l(t) = 1$, i.e. $x(t) \in X_b$. If $\theta_n \neq 0$ then $x(t) \notin X_b$.

Combining Proposition 1 and Proposition 2 leads to Corollary 1:

Corollary 1 [Balanced HV and Charged LV Elements]

A system charge state is balanced and charge (i.e. $x(t) \in X_b \cap X_c$) if and only if the transformed system charge state is null/zero (i.e. $\tilde{x}(t) = 0_n$).

Proof of Corollary 1

Corollary 1 follows directly from the proofs of Proposition 1 and Proposition 2.

The dynamic model defined in Equation (3) can be updated using the affine system transformation defined in Equation (10). Multiplying Equation (3) by L and subtracting r yields a transformed dynamic model of the system charge state defined by Equation (13):

$$\tilde{x}(t+1) = \tilde{x}(t) + \tilde{B}p(t), \tag{13}$$

where $\tilde{B} = LB \in R^{n \times n}$.

Feasibility of Balancing and Charging

The embodiments described herein relating to a battery-balancing apu aim to balance the HV elements 108 and/or charge the LV elements 110/214. In this section, we explain whether a balanced system charge state ($x(\tau) \in X_b$) and/or a fully charged system charge state ($x(\tau) \in X_c$) may be feasible at a second sampling time $t = \tau$ for a given initial system charge state ($x(0) \in X$) at a first sampling time $t = 0$ with $\tau \in N_{\geq 0}$.

To simplify the description herein, the storage elements 108/110/214 are assumed to be ideal (no losses and capacity is independent from the discharge current) and the links 112 are assumed to be ideal (no power conversion losses). The energy stored in each storage element 108/110/214 can be defined as $e_j(t) = v_j(t)Q_j x_j(t)$. The total energy stored in the system 100 can thus be defined according to Equation (14):

$$e_t(t) = v(t)'Qx(t) \tag{14}$$

The total energy of system 100 is constant, when the system components are assumed to be ideal as described above. In addition, the total HV energy, i.e. the energy stored in the HV elements 108 can be defined according to Equation (15):

$$e_{hv,t}(t) = \sum_{j=1}^{n} v_j(t) Q_j x_j(t). \tag{15}$$

The required balancing energy can be defined as the energy that needs to be discharged from the HV elements 108 such that all HV elements 108 have the same (minimum) element state charge (SOC)

$$e_{hv,b}(t) = e_{hv,t}(t) - \sum_{j=1}^{n} v_{j,xmin}(t) Q_j x_{min}(t), \tag{16}$$

where $v_{j,kmin}(t)$ is the voltage of storage element j at $x_{min}(t) = \min\{x_1(t), \ldots, x_n(t)\}$.

The required charging energy can be defined as the energy that can be supplied to the LV elements 110/214 until they are fully charged $$e_{lv,c}(t) = v_{l,max} Q_l - v_l(t) Q_l x_l(t), \tag{17}$$

where $v_{l,max}$ is the voltage of the LV elements 110/214 when they are fully charged. First, we use the energy notion to obtain results regarding balancing.

Proposition 3 [Balancing Feasibility with Bidirectional Links]

If the components of system 100 are assumed to be ideal, and each converter 112 can provide current from the high-voltage section 101 to the low-voltage section 103 ($I_{k,max}>0$) and from the low-voltage section 103 to the high-voltage section 101 ($I_{k,min}<0$) for all $k \in \{1, \ldots, n\}$ then a balanced system charge state $x(\tau) \in X_b$ for a second sampling time $\tau \in N_{\geq 0}$ is feasible for all initial system charge states $x(0) \in X$.

Proof of Proposition 3

When the voltage converters 112 are bidirectional, each HV element 108 can be discharged supplying energy to the LV element(s) 110/214. Similarly, each HV element 108 can be charged absorbing energy from the LV element(s) 110/214.

Balancing the system charge state can involve charging HV energy storage elements 108 with lower element charge states (SOC) and discharging HV energy storage elements 108 with higher element charge states (SOC). The condition $x(t) \in X$ can always be satisfied since the total energy supplied to the LV elements 110/214 can be positive, zero, or negative and $x(t) \in X_b$ can be achieved without altering the energy (charge) of the LV elements 110/214.

Figure 5:
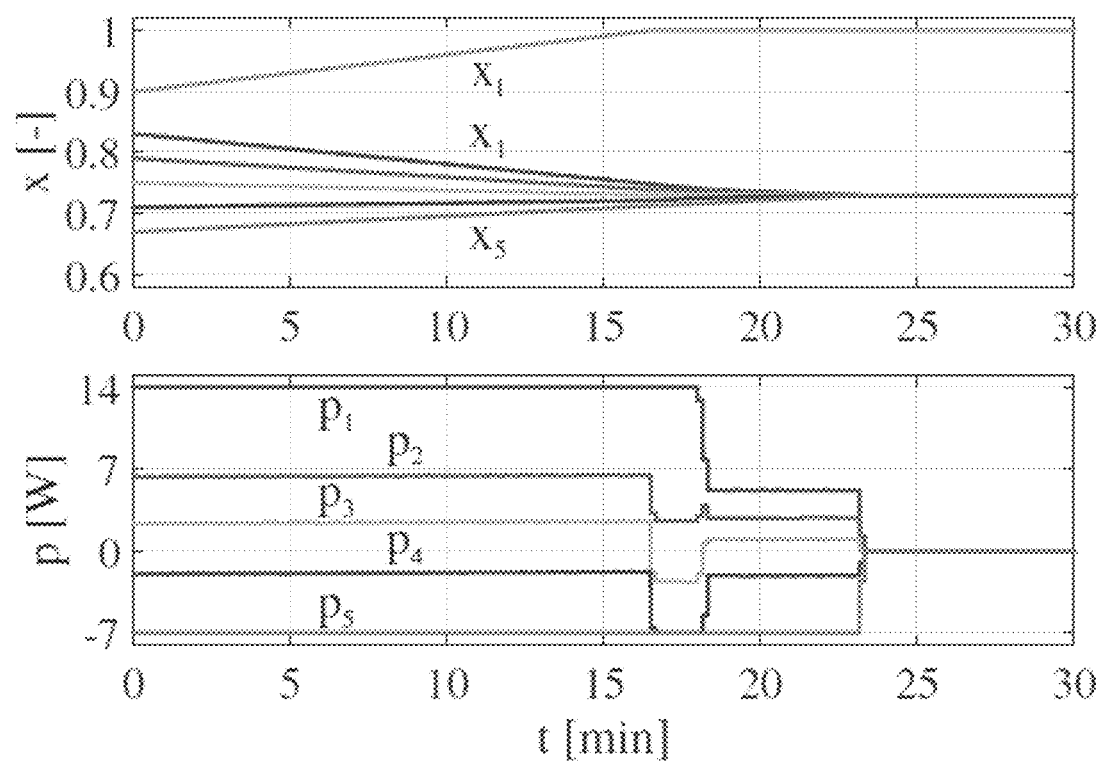
FIG. 5 illustrates an example plot of element charge state and power transmission levels for an energy storage system in accordance with an example embodiment.

Referring now to FIG. 5, shown therein is a plot of the element charge state x for five HV energy storage elements ($x_1 \ldots x_5$) and one LV energy storage element ($x_l$) over a 30 minute period. FIG. 5 also includes a plot of the power transmission levels for five voltage converters ($p_1 \ldots p_5$) over the same period.

The plots shown in FIG. 5 illustrate element charge states and power transmission levels of system 200 implemented according to Proposition 3. In the test implementation used to generate the plots shown in FIG. 5, the controller is tuned only for balancing (i.e. to improve charge state balance) the system 200. The specifications of the example implementation of energy storage system 200 are shown in Table 1.

TABLE 1

Example System Parameters

| Parameter | Value |
| --- | --- |
| Control hardware: DSP | Texas Instruments TMS320F28377D |
| Balancing hardware | Linear Technology DS2100A |
| Number of HV elements n | 5 |
| Capacity $Q_1, Q_2, Q_3, Q_4, Q_5$ | 12 Ah, 9 Ah, 9 Ah, 12 Ah, 12 Ah |
| Capacity of the LV element $Q_l$ | 3 Ah |
| Max/min link power $P_{k,max}, P_{k,min}$ | 14 W, −7 W |

Initially, the LV element is charged as this maximizes the balancing performance. Once the LV element is full (i.e. $x_l=1$), balancing continues at a slower rate redistributing energy among the HV elements 108. Thus, balancing with bidirectional voltage converters 112 should be feasible in all (or substantially all) initial system charge states.

Embodiments described herein with such a capacitive storage element balancing hardware (see, for example, M. Preindl, C. Danielson, and F. Borrelli, "Performance evaluation of battery balancing hardware", in *European Control Conference (ECC)*, 2013 the entirety of which is incorporated herein by reference), where the LV element has infinitesimal capacity (relative to the HV energy storage elements 108) as with LV element 110 shown in FIG. 1, can use this approach for balancing.

The hardware used for the system may be simplified using unidirectional balancing links 112. However, unidirectional balancing links 112 may affect the ability to balance the HV cells 108 as described with reference to Proposition 4.

Proposition 4 [Balancing Feasibility with Unidirectional Links]

If the components of the system are assumed to be ideal, and each converter 112 can provide current only from the high-voltage section 101 to the low-voltage section 103 ($I_{k,max}>0$, $I_{k,min}=0$) for all $k \in \{1, \ldots, n\}$ then a balanced system charge state $x(\tau) \in X_b$ for a second sampling time $\tau \in N_{\geq 0}$ is feasible if and only if the required balancing energy is less than the required charging energy:

$$e_{hv,b}(0) \leq e_{lv,c}(0). \qquad (18)$$

Proof of Proposition 4

Unidirectional links 112 can only discharge the HV elements 108. That is, voltage converters 112 that are unidirectional cannot charge the HV elements 108 by having current flow from the low-voltage section 103 to the high-voltage section 101. Accordingly, balancing the system charge state requires discharging the HV elements 108 with higher element charge states such that the element charge state of each HV element 108 is equal to the element charge state of the least charged HV element 108 (i.e. $x_j(t)=x_{min}(0)$ for all $j \in \{1, \ldots, n\}$). Accordingly, the required balancing energy $e_{hv,b}(0)$ must all be transferred to the LV storage elements 110/214. The LV storage elements 110/214 can absorb the required charging energy $e_{lv,b}(0)$ before they are fully charged. Accordingly, the charge states of the HV elements 108 can be balanced if and only if the required balancing energy is less than the required charging energy ($e_{lv,b}(0) \leq e_{lv,c}(0)$).

Figure 6:
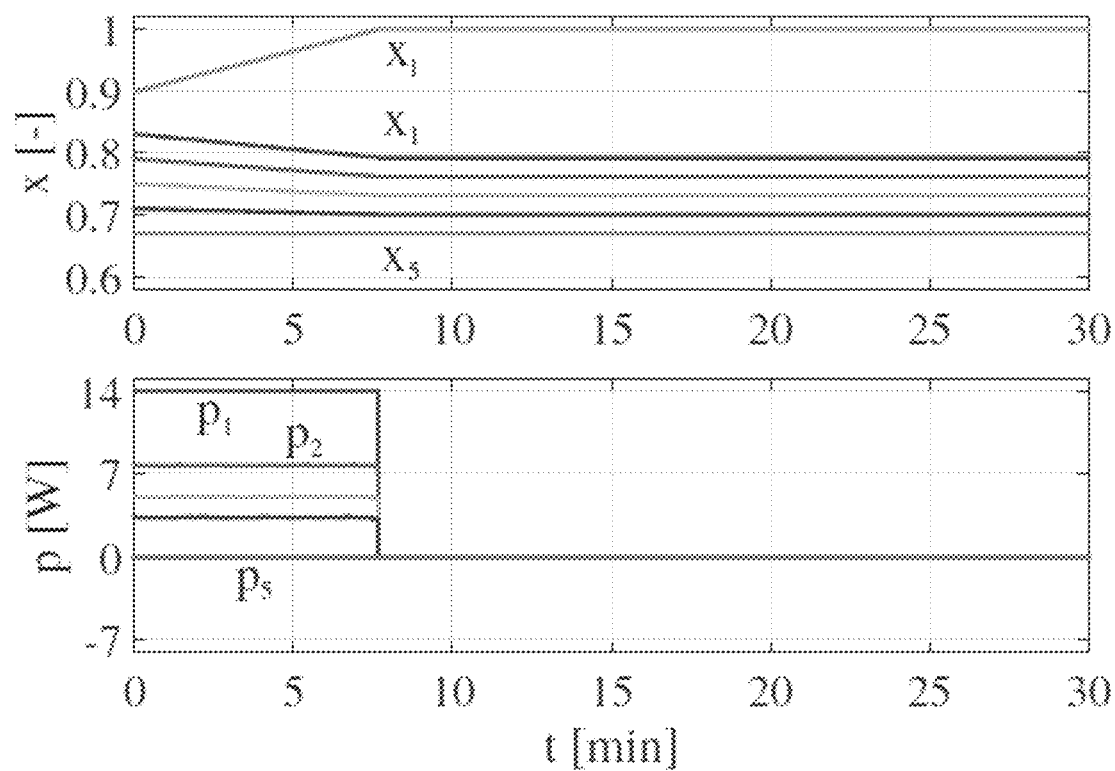
FIG. 6 illustrates another example plot of element charge state and power transmission levels for another energy storage system in accordance with another example embodiment.

Referring now to FIG. 6, shown therein is a plot of the element charge state x for five HV energy storage elements ($x_1 \ldots x_5$) and one LV energy storage element ($x_l$) over a 30 minute period. FIG. 6 also includes a plot of the power transmission levels for five voltage converters ($p_1 \ldots p_5$) over the same period. The plots shown in FIG. 6 illustrate element charge states and power transmission levels of a system 100 implemented according to Proposition 4.

The plots shown in FIG. 6 were generated using an implementation of energy storage system 200 in which the controller is tuned only for balancing (i.e. to improve charge state balance) the system 200. The system parameters used to generate the plots shown in FIG. 6 are analogous to those used to generate the plots for FIG. 5 with the exception that the voltage converters 112 are unidirectional (and thus $P_{k,min}$ is 0). Unidirectional links 112 have to charge the LV element 110/214 to balance the HV elements 108. Once the LV elements 110/214 are full, balancing stops.

As the plots shown in FIG. 6 illustrate, balancing with unidirectional converters 112 may only be feasible when the required balancing energy is less than the required charging energy $e_{lv,b}(0) \leq e_{lv,c}(0)$. In the implementation used to generate the plots shown in FIG. 6 $e_{lv,b}(0)=73.3$ kJ $> e_{lv,c}(0)=16.0$ kJ, thus the HV 108 elements cannot balance.

Proposition 5 [Charging Feasibility]

If the components of the system are assumed to be ideal, and using converters 112 that can be unidirectional or bidirectional (i.e. $I_{k,max}>0$, $I_{k,min} \leq 0$) for all $k \in \{1, \ldots, n\}$ then a charged system charge state $x(\tau) \in X_c$ at a second sampling time $\tau \in N_{\geq 0}$ is feasible if and only if the required charging energy is less than or equal to the total HV energy:

$$e_{lv,c}(0) \leq e_{hv,t}(0) \qquad (19)$$

Proof of Proposition 5

Charging the LV storage element entails adding the required charging energy $e_{lv,c}(0)$ to the current energy stored by the LV storage element. The required charging energy is transferred from the HV elements 108 using the voltage converters 112. The HV elements 108 store the total HV energy $e_{hv,t}(0)$ as set out in Equation (15) above. Hence, the LV storage elements can be fully charged if and only if the required charging energy is less than the total HV energy $e_{lv,c}(0) \le e_{hv,t}(0)$.

Figure 7:
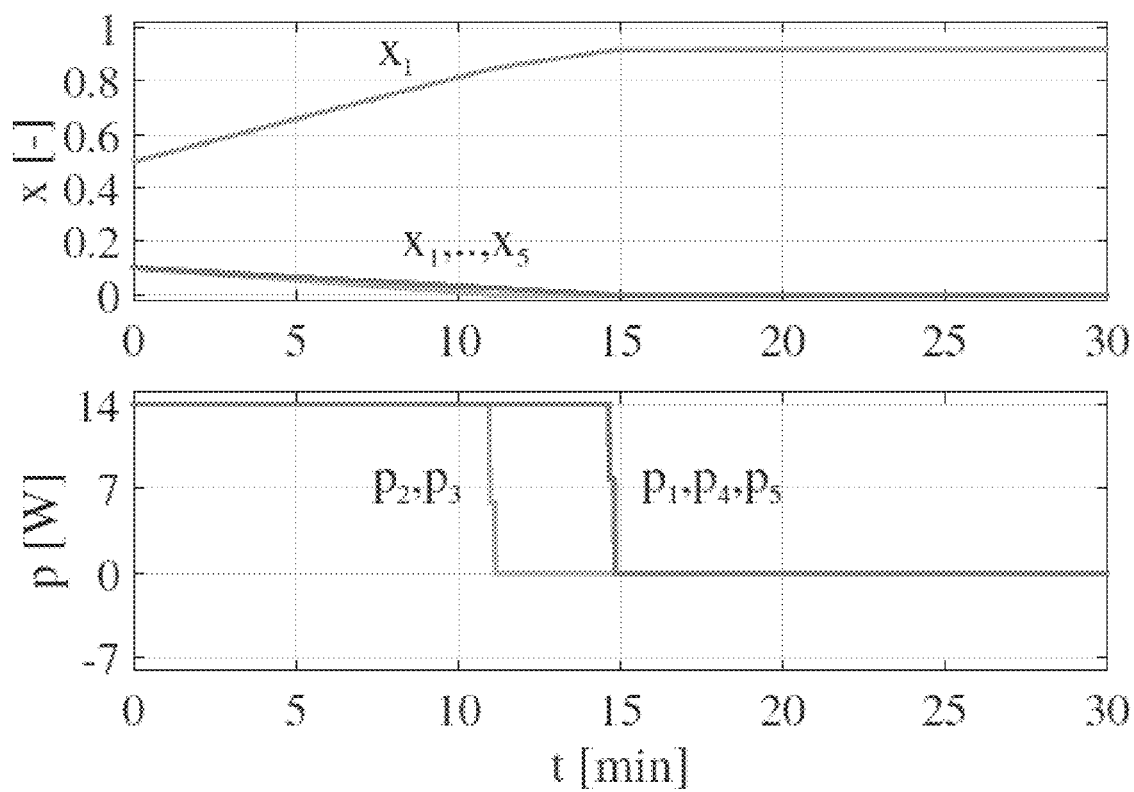
FIG. 7 illustrates another example plot of element charge state and power transmission levels for another energy storage system in accordance with another example embodiment.

Referring now to FIG. 7, shown therein is a plot of the element charge state x for five HV energy storage elements $(x_1 \ldots x_5)$ and one LV energy storage element $(x_l)$ over a 30 minute period. FIG. 7 also includes a plot of the power transmission levels for five voltage converters $(p_1 \ldots p_5)$ over the same period.

The plots shown in FIG. 7 illustrate element charge states and power transmission levels of a system implemented according to Proposition 5. In the test implementation used to generate the plots shown in FIG. 7, the controller is tuned only for charging (i.e. to improve element charge state of a low voltage storage element) the system and the required charging energy is greater than the total HV energy $e_{lv,c}(0) = 75.6$ kJ $> e_{hv,t}(0) = 57.2$ kJ.

As the plots shown in FIG. 7 demonstrate, the LV storage elements cannot be charged once the HV elements 108 have been completely depleted. Once the charge state of each of the HV elements reaches 0 (at about t=15), power is no longer transferred to the LV storage element. Accordingly, since the LV storage element has not yet reached its fully charged state, the LV storage element cannot be successfully charged.

Proposition 5 formalizes that the HV elements 108 need to contain sufficient energy to charge the LV element. The feasibility conditions of the balancing and charging can be combined. Using bidirectional converters 112, an initial system charge state for a first sampling time can be balanced and charged at a second sampling time (i.e. $x(\tau) \in X_b \cap X_c$) if and only if the required charging energy is less than or equal to the total HV energy (i.e. Proposition 5 and condition (19) hold). Using unidirectional links for converters 112, an initial system charge state for a first sampling time can be balanced and charged at a second sampling time (i.e. $x(\tau) \in X_b \cap X_c$) if and only if the required charging energy is less than or equal to the total HV energy and the required balancing energy is less than or equal to the required charging energy (i.e. both Proposition 4 and Proposition 5 hold). This yields the balanced and charged condition for unidirectional links set out in Equation (20)

$$e_{lv,b}(0) \le e_{lv,c}(0) \le e_{hv,t}(0). \quad (20)$$

As illustrated above, unidirectional converters 112 have some drawbacks compared to bidirectional converters. For example, the requirements for balancing the system charge state are restrictive as shown by equations (18) and (20). However, these requirements have been developed using the assumption that the LV section 103 does not supply power to an auxiliary system. In practice, the LV section 103 can absorb power such that balancing using unidirectional links 112 should be possible over time. However, this operation is dependent on the load coupled to the LV section 103. In some cases, the load can be controlled adding a LV chopper 316.

As a skilled reader will appreciate, the foregoing discussion describes results for an idealized energy storage system 100/200/300/400. In practice, voltage converters 112 will likely have an efficiency <1, and the charging and discharging of energy storage cells can generate losses in the cells. Also, the effective capacity of a battery can be dependent on how rapidly it is discharged according to Peukert's law. Accordingly, the proposed criteria described above define approximations for a realistically implemented system. However, these criteria can be evaluated at a plurality of sampling times t (instead of a single evaluation at t=0 s as described above) to update the approximations to reflect actual changes. This updated information can be used by the controller of the energy storage system 100 to take appropriate actions, e.g. to stop charging an LV battery 214 when $e_{lv,t}(t)$ is too low.

Example Control Methods

In this section, embodiments of methods for controlling an energy storage system such as the battery-balancing APM are described.

In some embodiments, balancing and charging can be addressed using a single constrained multi-input multi-output controller. Such embodiments may be referred to as monolithic control methods and an example method 800 is illustrated in the block diagram shown in FIG. 8A.

Embodiments described herein may control the energy storage system using predictive control techniques that may be referred to as model predictive control (MPC). At 804, the controller 802 for the energy storage system determines the initial system charge state (x(t)) of the energy storage system. The system charge state can include an element charge state corresponding to each of the energy storage elements (HV energy storage elements and LV storage elements) that represents a charge level of that energy storage element. As discussed above, the system charge state also defines a charge balance state that represents the relative element charge states of the high-voltage energy storage elements.

The controller of the energy storage system may predict or estimate a subsequent system charge state based on the initial system charge state and the power to be transferred by the converters 112. Accordingly, the controller may calculate a plurality of potential system charge states based on the initial system charge state and a plurality of potential power transmission sets for the voltage converters. Each potential system charge state may represent an estimate of the subsequent system charge state that would result if the voltage converters transmitted power according to the corresponding potential power transmission set. The controller may then select one of the potential power transmission sets based on a preferred potential system charge state (in terms of balancing and/or charging the energy storage system). The selected power transmission set may then be used to define control inputs for the voltage converters 112. The control inputs may be applied to the voltage converters 112 to adjust the power level being transmitted by at least one of the voltage converters. The controller may repeat the process continually to control operation of the energy storage system.

To determine a subsequent system charge state, the controller may determine a plurality of potential charge balance states for a second sampling time based on the initial system charge state and a plurality of potential power transmission sets for the voltage converters. Each potential charge balance state corresponding to one of the potential power transmission sets. The controller may select one of the potential power transmission sets based on the subsequent system charge state that is most balanced.

The controller may also determine a plurality of potential element charge states of the low voltage storage element at the second sampling time. Each potential element charge state may correspond to one of the potential power transmission sets. The controller may select one of the potential power transmission sets based on the subsequent system charge state that is most charged. In some cases, the controller may consider both the potential charge balance states and the potential element charge states in selecting the power transmission set. For example, in embodiments of monolithic control described herein, the potential charge balance states and the potential element charge states may be considered interdependently.

The controller 802 may use a cost function to determine the power transmission sets to be applied to the voltage converters 112 in order to optimize one or both of the balance and or charging states of the system 100. The controller may minimize the cost function to determine a set of power transmission levels that should be applied to the voltage converters 112. The cost function may be defined using a transformed system charge state, such as that described above with reference to Equation (13).

In some cases, the cost function may include a balance state component that is minimized when the charge balance state is maximally balanced. In some cases, the cost function may also include a charging state component that is minimized when the element charge state of a low voltage energy storage element is at a maximum charging value.

In embodiments using monolithic control the controller 802 can be configured to minimize a cost function that includes both a balance state component and a charging state component. The controller 802 may use constrained cost function such as the constrained finite time optimal control problem (CFTOC) set out in Equation (21):

$$\min_{p(t) \in P} q_b P\bar{R}\tilde{x}(t+1)P_q + q_c P\bar{R}\tilde{x}(t+1)P_q \quad (21)$$

$$\tilde{x}(t+1) = Lx(t+1) - r; \quad (22)$$

$$x(t+1) = x(t) + Bp(t) \in X. \quad (23)$$

As illustrated by Equation (22), the cost function (and each individual component) may be defined based on the transformed system charge state $\tilde{x}$. As Equation (23) illustrates, the system charge state at a subsequent sampling time can be determined based on the power transmission sets transferred by the voltage converters 112.

The controller may repeat the process of minimizing the cost function at multiple sampling times to determine the subsequent inputs to the voltage converters 112.

In examples described herein, the prediction horizon of the controllers has been chosen to be equal to one due assuming that battery voltages are slow varying with respect to one sampling time. A longer horizon can be chosen extending this assumption to multiple sampling times.

The cost function (21) can be defined using the infinity norm (q=∞), one norm (q=1) or squared two norm (q=2). As shown by Equation (21), the cost function may include a balance state component $P\bar{R}\tilde{x}(t+1)P_q$ and a charging state component $P\bar{R}\tilde{x}(t+1)P_q$. The cost function may be minimized, taking into account the balance state component and charging state component interdependently.

In the example cost function shown by Equation (21), the relative importance of the balance state component and charging state component may be adjusted using tuning coefficients. In the example of Equation (21) the coefficient $q_b$ defines the importance of the balance state component (i.e. the importance of balancing the system) and $q_c$ defines the importance of the charging state component (i.e. the importance of charging the LV storage element).

The cost function (21) may be implemented with a low voltage section includes energy storage elements having storage capacity that is not negligible with respect to the HV energy storage elements 108 (i.e. the capacity $Q_l$ of the LV element is sufficiently large). In these conditions, the terminal voltages corresponding to the HV energy storage elements 108 and the LV energy storage elements 214 $v_1, \ldots, v_n, v_l$ may be assumed to vary with similar rates. Accordingly, balancing and charging can be addressed interdependently. An example for this scenario is a HEV or EV where the LV bus is connected to an LV energy storage element 214 such as a lead-acid battery, for instance as shown in systems 200 and 300.

In presence of a small LV energy storage element alone, e.g. low-capacity capacitive storage element 110, LV voltage stabilization (i.e. charging) may require a significantly higher bandwidth and sampling rate than the bandwidth and sampling rate used in battery balancing (i.e. balancing the HV energy storage elements 108). In some cases, the monolithic controller 802 MPC may still be used with such systems. However, the constrained cost function set out by Equations (21)-(23) can be challenging to solve at fast sampling rates.

Accordingly, in some embodiments decoupled control methods may be used that separate the balancing and charging control. That is, power transmission sets may be determined separately to control the balance of the system charge state and to control the element charge state of the low voltage storage element. The balance power transmission set and charge power transmission set may be determined substantially independently such that they do not impact the operation of the other power transmission set (i.e. the balance power transmission set does not alter the charge state of the system and the charge power transmission set does not alter the balance state of the system).

A combined power transmission set may then be determined from the balance power transmission set and charge power transmission set. The combined power transmission set may be used to generate control inputs for the voltages converters 112. In some cases, the sampling rates for the balance power transmission set and charge power transmission set, such that they are updated with different periods.

Figures 8A, 8B:
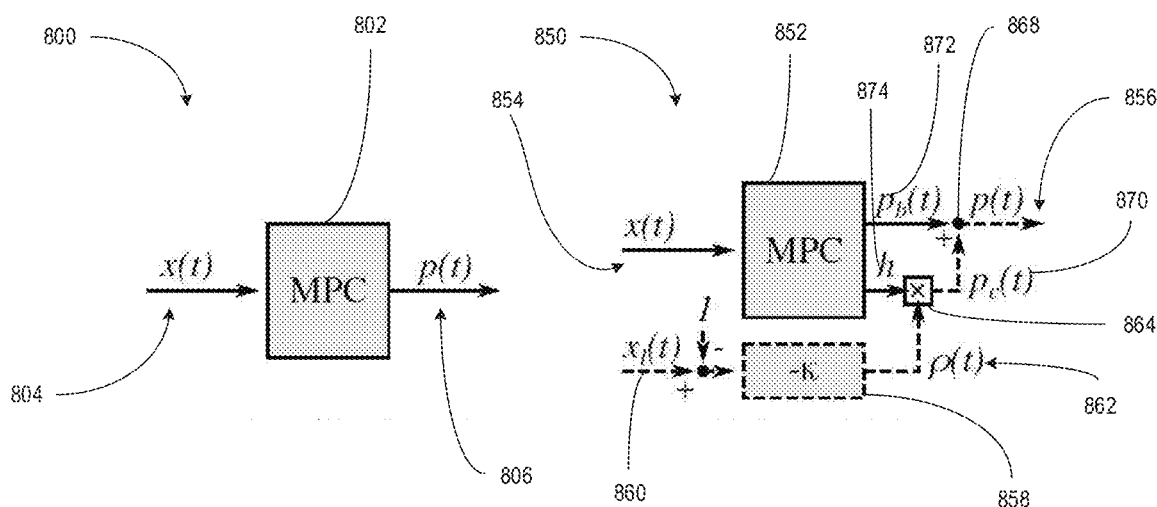
FIG. 8A illustrates an example flowchart of a first method for controlling an energy storage system in accordance with an example embodiment.
FIG. 8B illustrates an example flowchart of a second method for controlling an energy storage system in accordance with an example embodiment.

Conceptually, controlling the balance and charging of the energy storage system can be split into two subproblems and solved independently from each other. An example decoupled control method 850 is shown in FIG. 8B. As shown in FIG. 8B, the charging control (dashed path) may be executed at higher sampling frequencies, e.g. when the LV storage element is small.

The combined power transmission set p(t) output at 856 can be defined as the sum at 868 of the balance power transmission set $p_b(t)$ output at 872 and the charge power transmission set $p_c(t)$ output at 870

$$p(t) = p_b(t) + p_c(t), \quad (24)$$

The combined power transmission set can be used to define the control inputs to the voltage converters 112.

The balance power transmission set $p_b(t) \in R^n$ can be used to balance the system charge state without affecting charging of the system charge state. Similarly, the charge power transmission set $p_c(t) \in R^n$ can be used for charging the system charge state without affecting the charge distribution of the HV energy storage elements 108.

These properties can be formalized using Equations (10) and (12). The balance power transmission set component $p_b(t)$ can be constrained so that it does not alter the element charge state of the LV element between two sampling times, i.e. $R(\tilde{x}(t+1)-\tilde{x}(t))=0_n$. Using the transformed dynamic model of the system charge state defined by Equation (13), we obtain the balance power transmission set constraint:

$$p_b(t) \in P_b = \{p_b \in R^n | R\tilde{B}p_b = 0_n\} \tag{25}$$

Proposition 6—Balance Power Transmission Set Constraint

The balance power transmission set component $p_b(t)$ does not alter the element charge state of the LV element between two sampling times (i.e. $R\tilde{B}p_b(t)=0_n$) and only if $1_{n'}p_b(t)=0$.

Proof of Proposition 6

The HV components (i.e. the first n−1 components) of $R\tilde{B}p_b(t)$ are always zero due to the multiplication with R. Hence the balance power transmission set constraint (25) affects only the n-th dimension and can be represented as:

$$\tilde{x}_l(t) - \tilde{x}_l(t+1) = \frac{1}{Q_l v_l} 1_{n'} p_b(t) = 0. \tag{26}$$

The charge power transmission set $p_c(t) \in R^n$ can be constrained so that it charges the LV storage element without affecting the charge distribution of the HV energy storage elements 108, i.e. $R(\tilde{x}(t+1)-\tilde{x}(t))=0_n$. Substituting (13), we obtain the charge power transmission set constraint $$p_c(t) \in P_c = \{p_c \in R^n | \overline{R}\tilde{B}p_c = 0_n\} \tag{27}$$

Proposition 7—Charge Power Transmission Set Constraint

The charge power transmission set constraint $p_c(t) \in P_c$ is satisfied if and only if $p_c = h\rho(t)$, where $h = \overline{R}\tilde{B} \in R^{n \times 1}$ and the charge set scaling value $\rho(t) \in R$.

Proof of Proposition 7

The rank of $\overline{R}\tilde{B}$ is n−1 and its kernel is $h \in R^{n \times 1}$. Hence any charge power transmission set $p_c(t)$ can be expressed as $p_c(t) = h\rho(t)$ where the charge set scaling value $\rho(t)$ is a scalar. A decoupled control method may thus be derived based on the results of Propositions 6 and 7.

An example embodiment of a decoupled control method may then be defined according to Equations (28)-(33):

$$\min_{p(t) \in P} q_b P \overline{R} \tilde{x}(t+1) P_q \tag{28}$$

$$\tilde{x}(t+1) = Lx(t+1) - r; \tag{29}$$

$$x(t+1) = x(t) + Bp(t) \in X; \tag{30}$$

$$p(t) = p_b + h \in P; \tag{31}$$

$$1_{n'}p_b(t) = 0; p_b(t) \in P; \tag{32}$$

$$\overline{R}\tilde{B}h = 0_n; 1_{n'}h = P_{cr} \tag{33}$$

The example decoupled cost function (28) includes only a balance state component. That is, the cost function can be minimized based solely on balancing of the HV elements without consideration of the charging of the LV storage elements. As illustrated by Equation (29), the cost function can once again be defined using the transformed system charge state $\tilde{x}$.

As Equation (30) illustrates, the system charge state at a subsequent sampling time can be determined based on the combined power transmission set transferred by the voltage converters 112. The combined power flow (i.e. the combined power transmission set) over the converters 112 can be constrained to feasible power transmission levels as shown in Equation (31).

As discussed above, the balance power transmission set constraint (32) requires that a feasible $p_b(t)$ is used exclusively for balancing and does not alter the element charge state of the low voltage energy storage element. Similarly, the charging power transmission set constraint (33) requires that h is used solely for providing the rated charging power $P_{cr}$ to the LV section. The decoupled control method is feasible under the condition that the rated power delivered to the LV section $P_{cr} > 0$ does not exceed the maximum deliverable power:

$$P_{cr} \leq 1_{n'}[P_{1,max}, \ldots, P_{n,max}]'. \tag{34}$$

The example decoupled control method defines the balance power transmission set vector $p_b(t)$ and the charge power transmission set vector h (output at 874) that are used to define the combined power transmission set p(t) as set out in Equation (24), with the charge power transmission set defined by the charge power transmission set vector multiplied (at 864) by the charging scaling value $p_c(t) = h\rho(t)$. The charging scaling value $\rho(t) \in [0,1]$ can be chosen at 862 with e.g. a proportional controller (shown by 858) and defines the total power flow to the LV section $p_{ct}(t) = 1_{n'}h\rho(t)$.

Proposition 8

Let the balance power transmission set $p_b(t) \in P$ and the unscaled combined power transmission set $p_b(t) + h \in P$, then any combined power transmission set is feasible $p(t) = p_b(t) + h\rho(t) \in P$ for all charging scaling values $\rho(t) \in [0,1]$.

Proof of Proposition 8

The combined power transmission set vector $p(t) = p_b(t) + h\rho(t)$ with a charging scaling value $\rho(t) \in [0,1]$ lies between the balance power transmission set $p_b(t)$ and the unscaled combined power transmission set $p_b(t) + h$. If the balance power transmission set is feasible $p_b(t) \in P$ and the unscaled combined power transmission set is feasible $p_b(t) + h \in P$, then the combined power transmission set is feasible $p(t) \in P$ since P is convex.

In some embodiments, the decoupled control methods may require bidirectional links 112 for balancing. For example, in some cases if the links are unidirectional the balance power transmission set may be null $p_b(t) = 0_n$ and the combined power transmission set will only supply power to the LV section (i.e. will only charge). In such cases, balancing may still occur with unidirectional links and a small LV storage element by, for example, defining a charging vector that tends to balance the HV elements. However, the resulting balancing operation may be load dependent.

An example implementation of the energy storage system (e.g. a battery balancing APU) was validated by the inventors using both the monolithic control methods and decoupled control methods. The tested implementation used a reconfigured Linear Technology active battery balancing evaluation board. This board uses bidirectional flyback converters and was reconfigured to use an additional LV battery. A more powerful digital signal processor (DSP) was interfaced via serial peripheral interface (SPI) bus to simplify the implementation of general purpose numerical code. The system parameters are set out in Table 1 shown herein above.

The battery balancing APU was tested using both monolithic and decoupled control. Test results indicated that the energy storage system was able to charge the LV storage element and to balance the HV storage elements using both approaches. Each of FIGS. 9A-9I illustrate a plot of the element charge state x for five HV energy storage elements ($x_1 \ldots x_5$) and one LV energy storage element ($x_1$) over a 30 minute period as well as a plot of the power transmission levels for five voltage converters ($p_1 \ldots p_5$) over the same period. FIGS. 9A-9I illustrate the result of balancing and charging using monolithic and decoupled control using $q_c=1$, $r_f=0$ and the initial state $x(0)=[0.80, 0.78, 0.76, 0.74, 0.72, 0.70]'$.

Figure 9A:
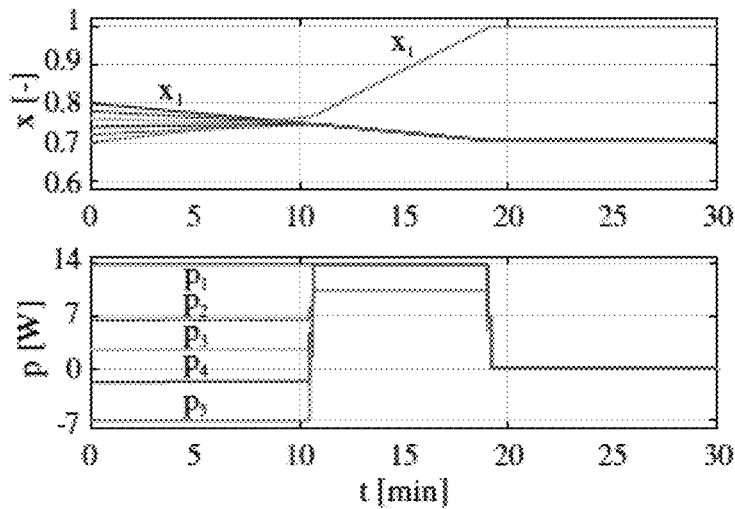
FIGS. 9A-9F illustrate example plots of element charge state and power transmission levels for energy storage systems using example embodiments of the first method for controlling an energy storage system shown in FIG. 8A.
Figure 9B:
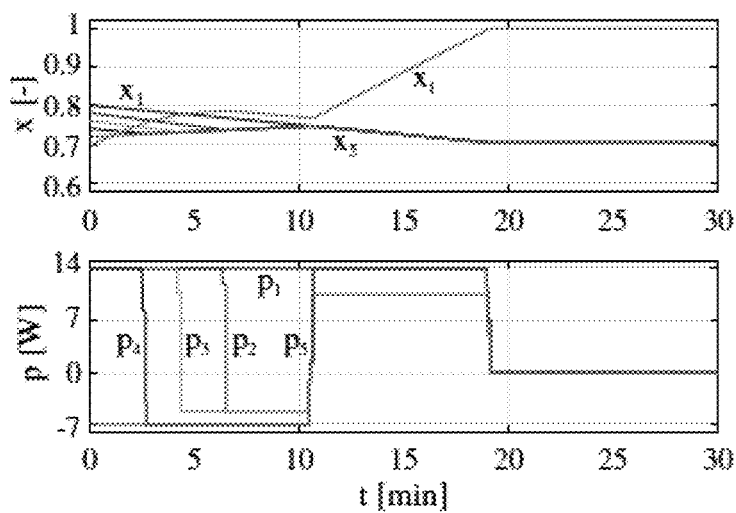
Figure 9C:
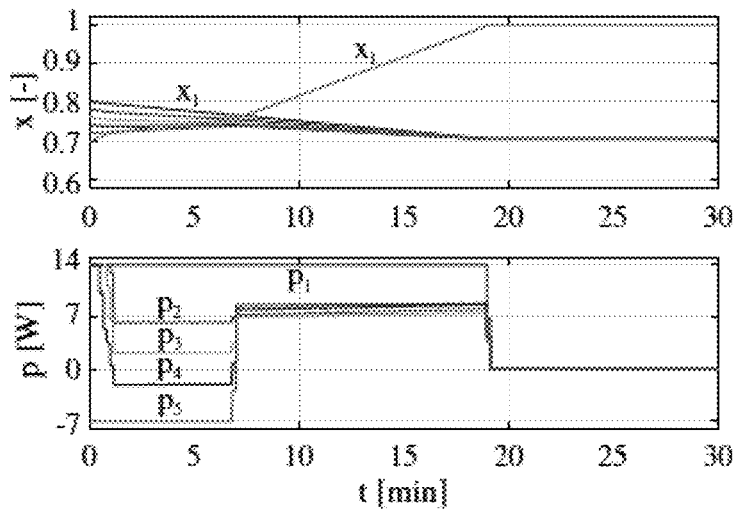
Figure 9D:
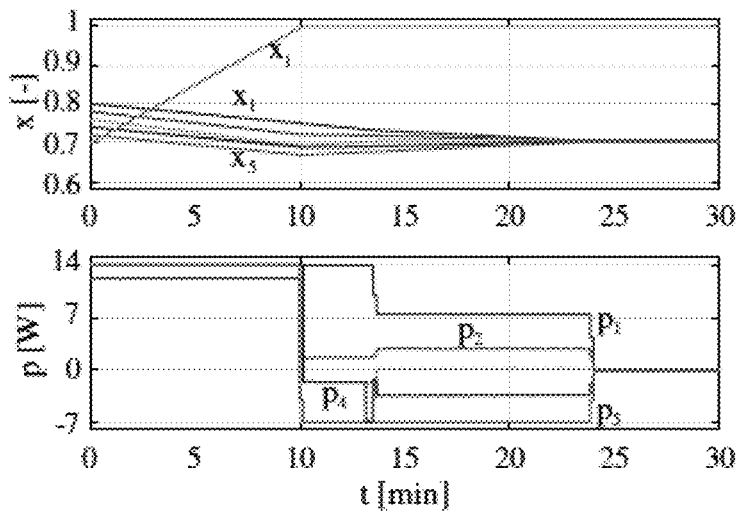
Figure 9E:
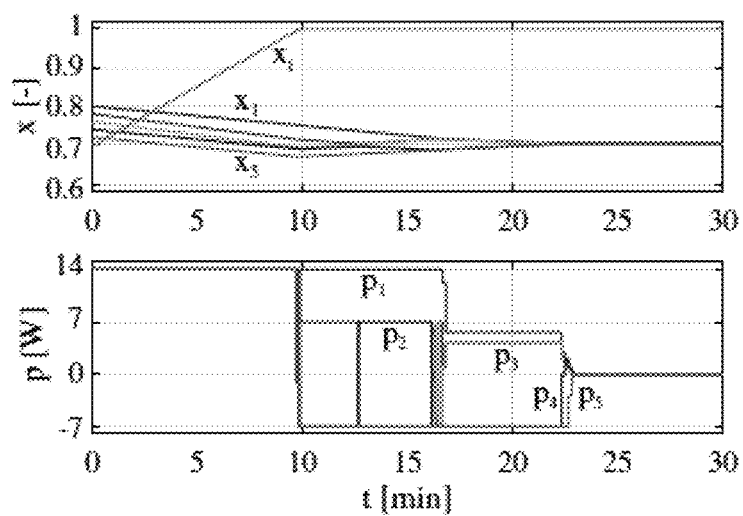
Figure 9F:
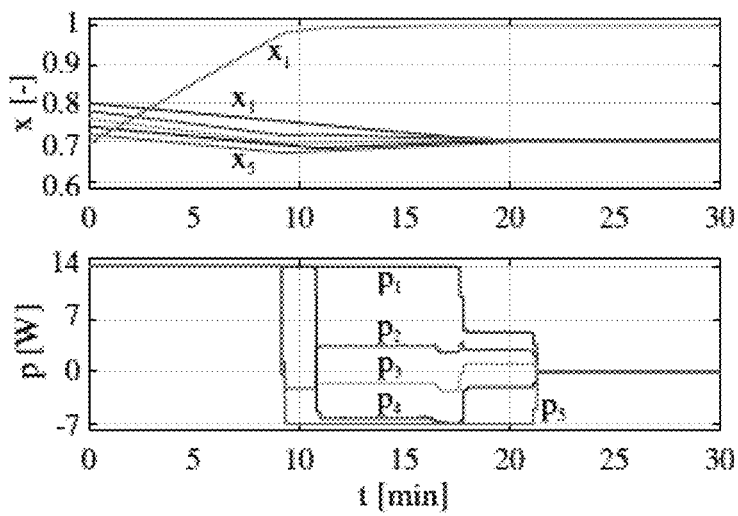

Embodiments of monolithic control methods such as those described herein may optimize both charging and balancing simultaneously and interdependently using a cost function to determine control inputs for the voltage converters. The cost function can be tuned to prioritize balancing with respect to charging as shown in FIG. 9A, FIG. 9B, and FIG. 9C where $q_b=100$. The cost function can also be tuned to prioritize charging with respect to balancing as shown in FIG. 9D, FIG. 9E, and FIG. 9F where $q_b=1$. The impact of various forms of the cost function are also illustrated by FIGS. 9A-9F. FIGS. 9A and 9D were generated using a cost function with a $\infty$-norm; FIGS. 9B and 9E were generated using a cost function with a 1-norm; and FIGS. 9C and 9F were generated using a cost function with a squared 2-norm.

As FIGS. 9A-9F show, the control trajectories depend on the type of cost function used. Compared to the quadratic cost function, the linear cost function tends to faster variations of the link power. However, similar times are required for charging and balancing.

Figure 9G:
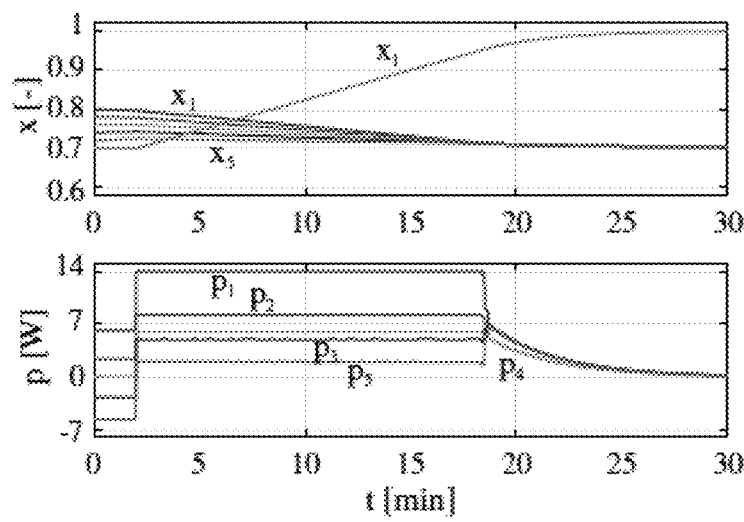
FIGS. 9G-9I illustrate example plots of element charge state and power transmission levels for energy storage systems using example embodiments of the second method for controlling an energy storage system shown in FIG. 8B.
Figure 9H:
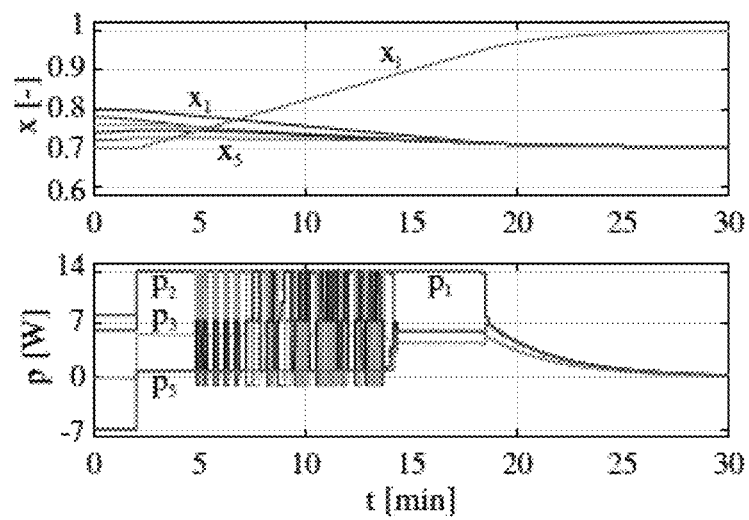
Figure 9I:
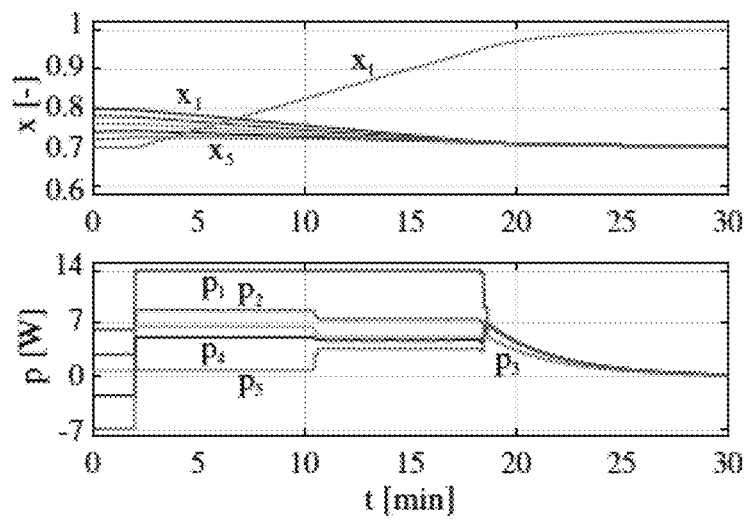

Embodiments of decoupled control methods such as those described herein may determine two power transmission sets (and potentially corresponding control inputs), where the first handles balancing and the second can be manipulated for charging. The charging power transmission set may be determined with the same or a higher sampling frequency with respect to the balance power transmission set. The plots shown in FIGS. 9G-9I were generated using decoupled control methods where the charging power transmission set was determined at 10 times the sampling frequency of the balancing power transmission set. FIG. 9G shows a decoupled control method using a $\infty$-Norm cost function; FIG. 9H shows a decoupled control method using a $\infty$-norm cost function; and FIG. 9I shows a decoupled control method using a squared 2-norm cost function;

The plots shown in FIGS. 9G-9I were generated using decoupled control methods where at t=0s, only balancing control is active (setting $\rho(t)=0$) and charging control (saturated gain) was activated at t=2s. As FIGS. 9G-9I show, the linear cost functions tend to yield faster variations of the power transmission sets compared to the quadratic cost function with similar outcome in terms of time required for balancing and charging.

In comparison with monolithic control, decoupled control determines balancing and charging control inputs independently from each other. In some embodiments using decoupled control methods, the full capability of the balancing hardware may not be used as a result. An extreme example is that balancing may not possible if the voltage converter links are unidirectional. However, decoupled control can achieve a high charging bandwidth since the charging control can be executed at higher sampling frequencies more easily.

In some embodiments, a system controller may be configured to implement a monolithic control method to balance HV modules and charge an LV battery using bi-directional converters 112. For example, system 200 shown in may enable high performance HV battery balancing and LV charging concurrently. The priority between balancing and charging can be adjusted (i.e. priority to HV balancing, priority to LV charging, balanced priority, or some intermediate position) e.g. using tuning coefficients as described herein above. An example implementation for system 200 would be an EV or HEV with a HV lithium-ion battery pack for the HV energy storage elements 108 and a LV section 203 with a lead-acid battery 214.

In some embodiments, a system controller may be configured to implement a decoupled control method to independently balance HV energy storage elements 108 and control charging of a LV battery 214 or capacitor 110 using bi-directional converters 112. Such embodiments may have reduced overall performance as compared with system implementing a monolithic control method, but LV charging may be implemented with a much higher bandwidth. This may be beneficial for systems with no or low capacity LV energy storage (i.e. a small battery or capacitor).

In some embodiments, the energy storage system may be configured to balance the HV energy storage elements as it charges the LV storage element (even with unidirectional converters 112). For example, balancing the HV energy storage elements may be optimized while accounting for the impact of a low voltage load connected to the low voltage section. A chopper 316 can be added to the energy storage system, as illustrated by system 300 shown in FIG. 3 and system 400 shown in FIG. 4. The controller may control the chopper so that it can function as a controlled load to discharge the LV energy storage element if it reaches its storage capacity. However, if the low voltage load is small, such an approach may tend towards dissipative balancing because the element charge state of the HV energy storage elements are being lowered by dissipating power through a controlled load.

Embodiments described herein provide systems, methods and apparatus for balancing energy storage systems such as those using batteries. Example embodiments described herein may enable the implementation of a non-dissipative battery balancing system.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. An energy storage system comprising:
 a high-voltage section including a high-voltage bus and a plurality of high-voltage energy storage elements electrically connected to the high-voltage bus;
 a low-voltage section including a low-voltage bus and a low-voltage energy storage element, the low-voltage bus electrically connectable to a low-voltage load;
 a plurality of voltage converters, each voltage converter electrically connected between one of the high-voltage energy storage elements and the low-voltage bus and operable to convert power between a high-voltage level of the high-voltage section and a low-voltage level of the low-voltage section; and
 a controller coupled to the plurality of voltage converters, the controller configured to
  i) determine an initial system charge state at a first sampling time, wherein the system charge state includes an element charge state corresponding to each of the high-voltage energy storage elements and low-voltage energy storage element that represents a charge level of that energy storage element and the system charge state defines a charge balance state representing relative element charge states of the high-voltage energy storage elements;
ii) calculate a plurality of potential charge balance states for a second sampling time based on the initial system charge state and a plurality of potential power transmission sets for the voltage converters, each potential charge balance state corresponding to one of the potential power transmission sets and the second sampling time being subsequent to the first sampling time;
iii) calculate a plurality of potential element charge states of the low voltage storage element at the second sampling time, each potential element charge state corresponding to one of the potential power transmission sets;
iv) select one of the potential power transmission sets by minimizing a cost function, wherein the cost function is defined using an affine transformation of the system charge state, the cost function includes a balance state component that is minimized when the charge balance state is maximally balanced, the cost function further includes a charging state component that is minimized when the element charge state of the low voltage energy storage element is at a maximum charging value, and the cost function includes at least one adjustable minimization coefficient defining a relative importance of the charging state component and the balance state component;
v) determine power converter inputs using the selected power transmission set; and
vi) adjust the power transmission level of at least one of the voltage converters using the determined power converter inputs.

2. The system of claim 1, wherein
the power converter inputs are determined based on the plurality of potential element charge states of the low voltage energy storage element.

3. The system of claim 2, wherein the controller is further configured to:
select a subsequent charge state of the low voltage energy storage element at the second sampling time from the at least one potential element charge state;
calculate a charging power transmission set based on the initial system charge state and the subsequent charge state;
determine a combined power transmission set by combining the charging power transmission set and the selected power transmission level set; and
determine the power converter inputs from the combined power transmission set.

4. The system of claim 3, wherein the voltage converters permit bidirectional current flow between the high-voltage section and the low-voltage section.

5. The system of claim 1, wherein the low voltage section further comprises a chopper element.

6. The system of claim 1, wherein the voltage converters permit bidirectional current flow between the high-voltage section and the low-voltage section.

7. The system of claim 1, wherein the voltage converters are unidirectional such that the voltage converters permit power to only flow from the high-voltage section to the low-voltage section.

8. The system of claim 1, wherein the power converter inputs are determined to improve the charge balance state non-dissipatively.

9. The system of claim 1, wherein the low-voltage energy storage element comprises a low-capacity capacitive energy storage element having a low-voltage energy storage capacity at least ten times less than a high-voltage energy storage capacity of any one of the high-voltage energy storage elements.

10. A method for balancing an energy storage unit that includes a plurality of high-voltage energy storage elements, a low-voltage section including a low-voltage bus and a low-voltage energy storage element and a plurality of voltage converters, each voltage converter electrically connected between one of the high-voltage energy storage elements and the low-voltage bus, the method comprising:
determining an initial system charge state at a first sampling time, wherein the system charge state includes an element charge state corresponding to each of the high-voltage energy storage elements and low-voltage energy storage element that represents a current charge level of that energy storage element and the system charge state defines a charge balance state representing relative element charge states of the high-voltage energy storage elements;
calculating a plurality of potential charge balance states for a second sampling time based on the initial system charge state and a plurality of potential power transmission sets for the voltage converters, each potential charge balance state corresponding to one of the potential power transmission sets and the second sampling time being subsequent to the first sampling time;
calculating a plurality of potential element charge states of the low voltage storage element at the second sampling time, each potential element charge state corresponding to one of the potential power transmission sets;
selecting one of the potential power transmission sets by minimizing a cost function, wherein the cost function is defined using an affine transformation of the system charge state, the cost function includes a balance state component that is minimized when the charge balance state is maximally balanced, the cost function further includes a charging state component that is minimized when the element charge state of the low voltage energy storage element is at a maximum charging value, and the cost function includes at least one adjustable minimization coefficient defining a relative importance of the charging state component and the balance state component;
determining power converter inputs using the selected power transmission set; and
adjusting the power transmission level of at least one of the voltage converters using the determined power converter inputs.

11. The method of claim 10, wherein
the power converter inputs are determined based on the plurality of potential element charge states of the low voltage energy storage element.

12. The method of claim 11, further comprising:
selecting a subsequent charge state of the low voltage energy storage element at the second sampling time from the at least one potential element charge state;
calculating a charging power transmission set based on the initial system charge state and the subsequent charge state;
determining a combined power transmission set by combining the charging power transmission set and the selected power transmission level set; and determining the power converter inputs from the combined power transmission set.

13. The method of claim 12, wherein the power converter inputs are determined to provide bidirectional current flow between the high-voltage section and the low-voltage section.

14. The method of claim 10, further comprising controlling dissipation from the low voltage section using a chopper element.

15. The method of claim 10, wherein the power converter inputs are determined to provide bidirectional current flow between the high-voltage section and the low-voltage section.

16. The method of claim 10, wherein the power converter inputs are determined to permit power to only flow from the high-voltage section to the low-voltage section.

17. The method of claim 10, wherein the power converter inputs are determined to improve the charge balance state non-dissipatively.

18. The method of claim 10, wherein the low-voltage energy storage element comprises a low-capacity capacitive energy storage element having a low-voltage energy storage capacity at least ten times less than a high-voltage energy storage capacity of any one of the high-voltage energy storage elements.

* * * * *